(12) United States Patent
Kärkkäinen et al.

(10) Patent No.: US 10,320,557 B2
(45) Date of Patent: Jun. 11, 2019

(54) ENCODER, DECODER AND METHODS EMPLOYING PARTIAL DATA ENCRYPTION

(71) Applicant: Gurulogic Microsystems Oy, Turku (FI)

(72) Inventors: Tuomas Kärkkäinen, Turku (FI); Ossi Kalevo, Akaa (FI)

(73) Assignee: GURULOGIC MICROSYSTEMS OY, Turku (FI)

( * ) Notice: Subject to any disclaimer, the term of this patent is extended or adjusted under 35 U.S.C. 154(b) by 0 days.

(21) Appl. No.: 15/512,265

(22) PCT Filed: Sep. 21, 2015

(86) PCT No.: PCT/EP2015/025065
§ 371 (c)(1),
(2) Date: Mar. 17, 2017

(87) PCT Pub. No.: WO2016/041641
PCT Pub. Date: Mar. 24, 2016

(65) Prior Publication Data
US 2017/0279604 A1    Sep. 28, 2017

(30) Foreign Application Priority Data

Sep. 19, 2014 (GB) .................................. 1416631.8

(51) Int. Cl.
*H04L 9/06* (2006.01)
*H04L 9/12* (2006.01)
(Continued)

(52) U.S. Cl.
CPC ............ *H04L 9/065* (2013.01); *H04L 9/0631* (2013.01); *H04L 9/0637* (2013.01);
(Continued)

(58) Field of Classification Search
CPC ............. H04N 21/234; H04N 21/2347; H04N 21/23476; H04N 21/438; H04N 21/4385;
(Continued)

(56) References Cited

U.S. PATENT DOCUMENTS

| 8,818,896 B2 * | 8/2014 | Candelore | ............. H04L 9/0861 705/51 |
| 8,850,498 B1 * | 9/2014 | Roach | ................ H04N 21/2347 375/240.27 |

(Continued)

FOREIGN PATENT DOCUMENTS

| CN | 102804766 A | 11/2012 |
| JP | 2004198760 A | 7/2004 |

(Continued)

OTHER PUBLICATIONS

Bhargava et al., MPEG Video Encryption Algorithms, 2004, Kluver Academic Publishers,Multimedia Tool and Apllications, pp. 57-79.*
(Continued)

*Primary Examiner* — Shanto Abedin
*Assistant Examiner* — Adrian Stoica
(74) *Attorney, Agent, or Firm* — Ziegler IP Law Group, LLC

(57) ABSTRACT

A method of encoding and encrypting input data (D1) to generate corresponding encoded and encrypted data (E2) is provided. The input data (D1) is encoded to generate intermediate encoded data streams. The intermediate encoded data streams include at least one critical data stream that is critical and essential for subsequent decoding of one or more remaining data streams of the intermediate encoded data streams. The at least one critical data stream is encrypted using one or more encryption algorithms to generate at least one intermediate encrypted data stream. Subsequently, unencrypted portions of the intermediate encoded data (Continued)

streams are merged together with the at least one intermediate encrypted data stream to generate the encoded and encrypted data (E2).

18 Claims, 5 Drawing Sheets

(51) Int. Cl.
*H04N 21/2347* (2011.01)
*H04N 21/2389* (2011.01)
*H04N 21/4385* (2011.01)
*H04N 21/4405* (2011.01)

(52) U.S. Cl.
CPC .............. *H04L 9/0662* (2013.01); *H04L 9/12* (2013.01); *H04N 21/23476* (2013.01); *H04N 21/23897* (2013.01); *H04N 21/43856* (2013.01); *H04N 21/44055* (2013.01); *H04L 2209/30* (2013.01); *H04L 2209/34* (2013.01); *H04L 2209/38* (2013.01)

(58) Field of Classification Search
CPC ............. H04N 21/43853; H04N 21/44; H04N 21/4405; H04N 21/44055; H04N 21/63; H04N 21/633; H04N 21/6332; H04N 21/6334; H04N 21/63345; H04L 9/06; H04L 9/0618; H04L 9/0631; H04L 9/0637; H04L 9/065; H04L 9/0656; H04L 9/0662; H04L 9/12
See application file for complete search history.

(56) References Cited

U.S. PATENT DOCUMENTS

| | | | |
|---|---|---|---|
| 2003/0012275 A1* | 1/2003 | Boice | H04N 5/145 375/240.01 |
| 2004/0081333 A1 | 4/2004 | Grab et al. | |
| 2009/0175358 A1* | 7/2009 | Gordon | H04N 19/61 375/240.28 |
| 2012/0134496 A1 | 5/2012 | Farkash et al. | |
| 2013/0094566 A1* | 4/2013 | Milstein | H04N 19/63 375/240.02 |

FOREIGN PATENT DOCUMENTS

| | | | |
|---|---|---|---|
| JP | 2014520282 A | 8/2014 | |
| WO | 2010150056 A1 | 12/2010 | |

OTHER PUBLICATIONS

Wu et al., Efficient Multimedia Encryption via Entropy Codec Design, 2001, Proceedings of SPIE vol. 4314, pp. 128-138.*
Lian et al., Selective Video Encryption Based on Advanced Video Coding,2005, Springer-Verlag Berlin Heidelberg, PCM 2005 Part II, pp. 281-290.*
International Search Report, Application No. PCT/EP2015/025065, dated Nov. 11, 2015, 3 pages.
Notification of Transmittal of the International Preliminary Report on Patentability, Application No. PCT/EP2015/025065, dated Sep. 12, 2016, 26 pages.
Shiguo Lian et al. "Selective Video Encryption Based on Advanced Video Coding", Jan. 1, 2005, Advances in Multimedia Information Processing—PCM 2005 Lecture Notes in Computer Science; LNCS, Springer, Berlin, DE, 10 pages.
China Patent Office, Office Action, Application No. 201580050177.5, dated Nov. 3, 2017, 10 pages.
Japanese Patent Office, Office Action—Refusal reason letter of advice, Application No. 2017-515203; dated Sep. 27, 2017 (english language translation).
EP Communication pursuant to Article 94(3) EPC, Application No. 15 775 384.9, dated Feb. 1, 2018, 7 pages.
China Second Office Action, Application No. 201580050177.5, dated Apr. 10, 2018, 15 pages.
Bharat et al. "MEPG Video Encryption Algorithms" Multimedia Tools and Applications, 24, 57-79, 2004, Sep. 1, 2004, copyright 2004 Kluwer Adademic Publishers. Manufactured in the Netherlands, 23 pages.
China Office Action, Application No. 201580050177.5, dated Jul. 11, 2018, 16 pages.
European Patent Office, Communication under Rul 71(3) EPC, application No. 15775384.9, dated Aug. 7, 2018, 7 pages.
Japan Notification of Reasons for Refusal, Application No. JP2017-515203, dated Jul. 10, 2018, 3 pages.
Notice to Undergo Registration Procedures (Notice I) and Notice to Grant Patent Right (Notice II) from China National Intellectual Property Administration (CNIPA, formerly SIPO) dated Nov. 1, 2018 (2 pages) for corresponding Chinese Patent Appication No. 201580050177.5.
Letter from Insight Intellectual Property Attorneys reporting Notice to Undergo Registration Procedures (Notice I) and Notice to Grant Patent Right (Notice II) from China National Intellectual Property Administration (CNIPA, formerly SIPO) dated Nov. 1, 2018 for corresponding Chinese Patent Application No. 201580050177.5.
English language translation of allowed claims for corresponding Chinese Patent Application No. 201580050177.5.

* cited by examiner

ENCODER, DECODER AND METHODS EMPLOYING PARTIAL DATA ENCRYPTION

TECHNICAL FIELD

The present disclosure relates to encoders for encoding and encrypting input data (D1) to generate corresponding encoded and encrypted data (E2), and corresponding methods of encoding and encrypting input data (D1) to generate corresponding encoded and encrypted data (E2). Moreover, the present disclosure relates to decoders for decrypting and decoding encoded and encrypted data (E2) to generate corresponding decrypted and decoded data (D3), and corresponding methods of decrypting and decoding encoded and encrypted data (E2) to generate corresponding decrypted and decoded data (D3). Furthermore, the present disclosure is concerned with computer program products comprising a non-transitory computer-readable storage medium having computer-readable instructions stored thereon, the computer-readable instructions being executable by a computerized device comprising processing hardware to execute aforesaid methods. Additionally, the present disclosure concerns codecs including at least one aforementioned encoder and at least one aforementioned decoder.

BACKGROUND

In general, the term "encryption" refers to a process of encoding messages or information in such a way that only authorized parties can read the messages or information. A field of science that deals with encryption is called cryptography. Information has been encrypted throughout history, and it is well known that each encryption algorithm has its own associated weaknesses. Cryptanalysis, which is a branch of cryptology, is used to find weaknesses in encryption algorithms.

Encryption algorithms can be categorized into symmetric algorithms (namely, symmetric-key algorithms) and asymmetric algorithms (namely, asymmetric-key algorithms). The symmetric and asymmetric algorithms mutually differ in a way in which an encryption key is used and processed. Symmetric encryption algorithms use a shared common key to encrypt data at a transmitting end and to decrypt encrypted data at a corresponding receiving end. On the other hand, asymmetric encryption algorithms use two different keys, one of which is a public key used to encrypt data and the other is a private key used to decrypt encrypted data. Only the public key is shared between parties.

Moreover, there are one-way message digest functions, namely hash functions, which are not data encryption techniques as such, because data they represent are difficult or impossible to recover. However, one-way message digest functions are used to verify an authenticity of data and passwords, and also are used to generate encryption keys for encryption algorithms.

It is well known that data encryption is a technically demanding operation that requires considerable computing resources. Therefore, in order to save on computing resources and to reduce computing time, a hybrid combination of asymmetric and symmetric encryption algorithms is often used. This combination provides a sufficiently strong protection, such that unauthorized third-party decryption cannot be executed in real time with current computing resources. Such a kind of approach is commonly used in various different data transfer protocols, for example, such as Secure Sockets Layer (SSL)/Transport Layer Security (TLS) and Secure Shell (SSH), and in applications to sign and encrypt e-mail messages, for example, such as Pretty Good Privacy (PGP).

It has been established that cryptology, namely the scientific study of cryptography and cryptanalysis, is a continuously developing field of science that, with means for cryptanalysis, attempts to find weaknesses in encryption algorithms. For this reason, it is essential to be able to protect information maximally, but correspondingly there is a need to make compromises regarding use of computing resources used to implement the encryption. Moreover, the computing resources available are usually limited, especially in mobile devices which do their utmost to save battery power.

Moreover, e-mail applications typically enable encryption of:

(i) only e-mail messages, but not e-mail attachments of the e-mail messages, or (ii) only the e-mail attachments of the e-mail messages, but not the e-mail messages.

This means that an entire e-mail message, including its e-mail attachments, is not encrypted. However, such a kind of operation is employed based on either a usage scenario or an incompatibility between client software, and not as a result of modest processing power available for performing encryption.

In the last few years, there has been considerable research undertaken regarding partial encryption of image and video information, largely because an amount of data transfers over the Internet is growing exponentially year-by-year. Conventionally, a "partial image encryption" technique is commonly used in image and video codecs that is based on Discrete Cosine Transform (DCT) and Wavelets. However, this technique is inefficient as regards speed, and is weak as regards a degree of protection that is achievable.

In one conventional technique, pixel values of a given image are encrypted. In another conventional technique, an order of pixels in a given image block is scrambled by encryption. In yet another conventional technique, non-zero AC coefficients of DCT coding are encrypted. In still another conventional technique, details of an image, namely brightness, color contrast and so forth, are encrypted, while shapes and contours of patterns in the image are left unencrypted and are visible to a human viewer.

However, the aforesaid conventional techniques do not work efficiently, because current prior art technology uses such methods for coding images that do not intrinsically produce partial data streams. As a result, the aforesaid conventional techniques fail to enable efficient partial image encryption, without making compromises between a speed and a strength of encryption.

In a published United States patent application US2004/0081333A1 (Grab et al.; "Method and system for securing compressed digital video"), there is described a method for producing and for subsequently decrypting a protected stream of compressed video content. The method includes receiving an input stream of compressed video content containing a sequence of frames. A set of encrypted frames are created by encrypting selected frames of the sequence of frames in accordance with a frame encryption function. The method further includes generating frame decryption information necessary to decrypt the set of encrypted frames.

In another published patent application WO2010/150056 A1 (Murray et al.; "Partial encryption using variable block-size parameters", assigned to Nds Limited), there is described a method for partially encrypting data. A sequence of image frames is encoded by identifying intra and inter frames in the sequence and by applying a variable block size motion compensation (VBSMC) procedure to the inter frames, thereby generating respective parameters representing the inter frames. The block sizes are selectively encrypted, using an encryptor, without encrypting all of the parameters representing the inter frames. Finally, encoded data, representing the sequence of the image frames and comprising the encrypted block sizes, is outputted.

In a published article (Lian et al.; "Selective video encryption based on advanced video coding"), there is described a selective encryption technique for advanced video coding. The encryption technique provides secure video transmission. The encryption technique comprises encryption process with compression process having low cost. Moreover, the encryption technique keeps the file format unchanged with direct operations, such as displaying, time seeking, copying, cutting, etc. The encryption technique encrypts video data as intraprediction mode, intra-macroblock's residue and motion vector difference.

SUMMARY

The present disclosure seeks to provide an improved encoder for encoding and encrypting input data (D1) to generate corresponding encoded and encrypted data (E2).

Moreover, the present disclosure seeks to provide an improved decoder for decrypting and decoding encoded and encrypted data (E2) to generate corresponding decrypted and decoded data (D3).

In a first aspect, embodiments of the present disclosure provide an encoder for encoding and encrypting input data (D1) to generate corresponding encoded and encrypted data (E2), wherein the encoder includes a data processing arrangement for processing the input data (D1), characterized in that:
(a) the data processing arrangement is operable to encode the input data (D1) using a plurality of coding methods to generate a plurality of intermediate encoded data streams, wherein the plurality of intermediate encoded data streams comprises at least two critical data streams that are critical and essential for subsequent decoding of one or more remaining data streams of the plurality of intermediate encoded data streams, wherein the at least two critical data streams represent only a part of the plurality of intermediate encoded data streams;
(b) the data processing arrangement is operable to encrypt the at least two critical data streams using one or more encryption methods to generate at least two intermediate encrypted data streams; and
(c) the data processing arrangement is operable to merge unencrypted portions of the plurality of intermediate encoded data streams together with the at least two intermediate encrypted data streams to generate the encoded and encrypted data (E2).

Optionally, the data processing arrangement of the encoder is operable to encode and encrypt the input data (D1) provided in a form of at least one of: one-dimensional data, multi-dimensional data, text data, binary data, sensor data, audio data, image data, video data, encoded data, but not limited thereto.

The data processing arrangement of the encoder is operable to encode the input data (D1) to generate a plurality of intermediate encoded data streams. Optionally, for this purpose, the data processing arrangement of the encoder is operable to employ a plurality of split and/or combine operations to divide and/or combine the input data (D1) into a plurality of data blocks and/or data packets.

Optionally, the data processing arrangement of the encoder is operable to perform a statistical analysis and/or an iterative analysis of the plurality of data blocks and/or data packets to determine a plurality of parameters that are indicative of statistical variation within their respective data blocks and/or data packets. The data processing arrangement of the encoder is then optionally operable to employ the plurality of parameters to select one or more encoding methods to be used to encode information of the plurality of data blocks and/or data packets to generate the plurality of intermediate encoded data streams.

Subsequently, the data processing arrangement of the encoder is operable to employ the one or more encoding methods for encoding the information of the plurality of data blocks and/or data packets into the plurality of intermediate encoded data streams.

Optionally, the data processing arrangement of the encoder is operable to employ one or more entropy-encoding methods for compressing the plurality of data blocks and/or data packets into a plurality of entropy-encoded data blocks and/or data packets for inclusion in the plurality of intermediate encoded data streams. Such entropy encoding is optionally performed after one or more of data blocks and/or data packets are encoded using the aforementioned encoding methods.

The plurality of intermediate encoded data streams include at least one critical data stream that is critical and essential for subsequent decoding of one or more remaining data streams of the plurality of intermediate encoded data streams.

Optionally, the at least two critical data streams include information indicative of at least one of: a plurality of split and/or combine operations that are employed to divide and/or combine the input data (D1) into a plurality of data blocks and/or data packets, one or more encoding methods that are employed for encoding information of the plurality of data blocks and/or data packets, one or more entropy-encoding methods that are employed for entropy-encoding the plurality of data blocks and/or data packets into a plurality of entropy-encoded data blocks and/or data packets, and/or a length of the plurality of entropy-encoded data blocks and/or data packets in the entropy-encoded data streams, and/or a length of the plurality of data blocks and/or data packets prior entropy-coding.

Thus, the at least one critical data stream represents only a part of the plurality of intermediate encoded data streams.

Moreover, the data processing arrangement of the encoder is operable to encrypt the at least one critical data stream using one or more encryption algorithms to generate at least one intermediate encrypted data stream.

Subsequently, the data processing arrangement of the encoder is operable to merge unencrypted portions of the plurality of intermediate encoded data streams, namely the encoded information of the plurality of data blocks and/or data packets, together with the at least one intermediate encrypted data stream to generate the encoded and encrypted data (E2).

Furthermore, optionally, the data processing arrangement of the encoder is operable to compress the at least one of the at least two critical data streams into at least one compressed data stream prior to encrypting the at least one of the at least two critical data streams.

Optionally, the data processing arrangement of the encoder is operable to compute a first byte of the at least one compressed data stream such that the first byte describes an entropy encoding method that is employed for compressing the at least two critical data streams.

Optionally, information indicative of a length of the at least one compressed data stream is provided at a beginning of the at least one compressed data stream, for example, after the aforesaid first byte thereof.

Moreover, optionally, the data processing arrangement of the encoder is operable to define encryption by using at least one of: a new byte that is written at a beginning of an encrypted data stream, a Most Significant Bit (MSB) in an entropy encoding method byte and/or word, an order in which unencrypted and encrypted data streams are included in the encoded and encrypted data (E2), and/or a flag bit.

In a second aspect, embodiments of the present disclosure provide a method of encoding and encrypting input data (D1) to generate corresponding encoded and encrypted data (E2), via an encoder, wherein the encoder includes a data processing arrangement for processing the input data (D1), characterized in that the method includes:

(a) operating the data processing arrangement to encode the input data (D1) using a plurality of coding methods to generate a plurality of intermediate encoded data streams, wherein the plurality of intermediate encoded data streams comprises at least two critical data streams that are critical and essential for subsequent decoding of one or more remaining data streams of the plurality of intermediate encoded data streams, wherein the at least two critical data streams represents only a part of the plurality of intermediate encoded data streams;

(b) operating the data processing arrangement to encrypt the at least one critical data stream using one or more encryption algorithms to generate at least one intermediate encrypted data stream; and (c) operating the data processing arrangement to merge unencrypted portions of the plurality of intermediate encoded data streams together with the at least two intermediate encrypted data streams to generate the encoded and encrypted data (E2).

Optionally, the at least two critical data stream includes information indicative of at least one of: a plurality of split and/or combine operations that are employed to divide and/or combine the input data (D1) into a plurality of data blocks and/or data packets, one or more encoding methods that are employed for encoding information of the plurality of data blocks and/or data packets, one or more entropy-encoding methods that are employed for entropy-encoding the plurality of data blocks and/or data packets into a plurality of entropy-encoded data blocks and/or data packets, and/or a length of the plurality of entropy-encoded data blocks and/or data packets in the plurality of entropy-encoded data streams, and/or a length of the plurality of data blocks and/or data packets prior entropy-coding.

Optionally, the method includes:

(d) operating the data processing arrangement to perform a statistical analysis and/or an iterative analysis of the plurality of data blocks and/or data packets to determine a plurality of parameters that are indicative of statistical variation within their respective data blocks and/or data packets; and (e) operating the data processing arrangement to employ the plurality of parameters to select the one or more encoding methods to be used to encode the information of the plurality of data blocks and/or data packets to generate the plurality of intermediate encoded data streams.

Optionally, that the method includes operating the data processing arrangement to process the input data (D1) provided in a form of at least one of: one-dimensional data, multi-dimensional data, text data, binary data, sensor data, audio data, image data, video data, encoded data.

Optionally, the method includes operating the data processing arrangement to compress the at least one of the at least two critical data streams into at least one compressed data stream prior to encrypting the at least one of the at least two critical data streams. More optionally, the method includes operating the data processing arrangement to compute a first byte of the at least one compressed data stream such that the first byte describes an entropy encoding method that is employed for compressing the at least two critical data streams.

Optionally, the method includes operating the data processing arrangement to define encryption by using at least one of: a new byte that is written at a beginning of an encrypted data stream, a most significant bit in an entropy encoding method byte and/or word, an order in which unencrypted and encrypted data streams are included in the encoded and encrypted data (E2), a flag bit.

In a third aspect, embodiments of the present disclosure provide a computer program product comprising a non-transitory (namely non-transient) computer-readable storage medium having computer-readable instructions stored thereon, the computer-readable instructions being executable by a computerized device comprising processing hardware to execute the aforementioned method.

In a fourth aspect, embodiments of the present disclosure provide a decoder for decrypting and decoding encoded and encrypted data (E2) to generate corresponding decrypted and decoded data (D3), wherein the decoder includes a data processing arrangement for processing the encoded and encrypted data (E2), characterized in that:

(i) the data processing arrangement is operable to process the encoded and encrypted data (E2) to determine one or more encrypted portions and one or more unencrypted portions thereof, wherein the one or more unencrypted portions of the encoded and encrypted data (E2) comprise encoded information of a plurality of data blocks and/or data packets;

(ii) the data processing arrangement is operable to decrypt the at least two or more encrypted portions to determine sizes and/or relative positions and/or plurality of encoding methods that are associated with the plurality of data blocks and/or data packets;

(iii) the data processing arrangement is operable to apply an inverse of the plurality of encoding methods to the encoded information of the plurality of data blocks and/or data packets to decode the encoded information of the plurality of data blocks and/or data packets to generate a plurality of decoded data blocks and/or data packets; and (iv) the data processing arrangement is operable to assemble the plurality of decoded data blocks and/or data packets based on the sizes and/or relative positions associated with the plurality of data blocks and/or data packets to generate the decrypted and decoded data (D3).

Optionally, the data processing arrangement of the decoder is operable to decrypt and decode the encoded and encrypted data (E2) provided in a form of at least one of: encoded and encrypted one-dimensional data, encoded and encrypted multi-dimensional data, encoded and encrypted text data, encoded and encrypted binary data, encoded and encrypted sensor data, encoded and encrypted audio data, encoded and encrypted image data, encoded and encrypted video data, encoded data, but not limited thereto.

The data processing arrangement of the decoder is operable to process the encoded and encrypted data (E2) to determine one or more encrypted portions and one or more unencrypted sub-portions thereof. The one or more unencrypted portions of the encoded and encrypted data (E2) include encoded information of a plurality of data blocks and/or data packets.

The data processing arrangement of the decoder is operable to decrypt the one or more encrypted portions to determine sizes, relative positions and/or one or more encoding methods that are associated with the plurality of data blocks and/or data packets. Optionally, the data processing arrangement of the decoder is also operable to determine one or more entropy-encoding methods that are associated with the plurality of data blocks and/or data packets.

Moreover, optionally, the one or more encrypted portions are provided in a form of at least one compressed data stream. In such a case, the data processing arrangement of the decoder is optionally operable to determine, from a first byte of the at least one compressed data stream, an entropy encoding method that is associated with the at least one compressed data stream.

Optionally, information indicative of a length of the at least one compressed data stream is provided at a beginning of the at least one compressed data stream, for example, after the aforesaid first byte thereof.

Moreover, optionally, the data processing arrangement of the decoder is operable to determine the one or more encrypted portions and the one or more unencrypted portions using at least one of: a new byte that is written at a beginning of an encrypted data stream, a Most Significant Bit (MSB) in an entropy encoding method byte and/or word, a knowledge of an order in which unencrypted and encrypted data streams are included in the encoded and encrypted data (E2), and/or a flag bit.

The data processing arrangement of the decoder is then optionally operable to apply an inverse of the entropy encoding method to decompress the at least one compressed stream to determine the sizes, the relative positions and/or the one or more encoding methods that are associated with the plurality of data blocks and/or data packets. The data processing arrangement of the decoder is then operable to apply an inverse of the one or more encoding methods to the encoded information of the plurality of data blocks and/or data packets to decode the encoded information of the plurality of data blocks and/or data packets to generate a plurality of decoded data blocks and/or data packets. Optionally, the data processing arrangement of the decoder is also operable to apply an inverse of the one or more entropy-encoding methods to a plurality of entropy-encoded data blocks and/or data packets included in the one or more unencrypted portions of the encoded and encrypted data (E2), prior to applying the inverse of the one or more encoding methods.

Subsequently, the data processing arrangement of the decoder is operable to assemble the plurality of decoded data blocks and/or data packets based on the sizes and/or relative positions to generate the decrypted and decoded data (D3).

In a fifth aspect, embodiments of the present disclosure provide a method of decrypting and decoding encoded and encrypted data (E2) to generate corresponding decrypted and decoded data (D3), via a decoder, wherein the decoder includes a data processing arrangement for processing the encoded and encrypted data (E2), characterized in that the method includes:
(i) operating the data processing arrangement to process the encoded and encrypted data (E2) to determine one or more encrypted portions and one or more unencrypted portions thereof, wherein the one or more unencrypted portions of the encoded and encrypted data (E2) comprise encoded information of a plurality of data blocks and/or data packets;
(ii) operating the data processing arrangement to decrypt the one or more encrypted portions to determine sizes and/or relative positions and/or plurality of encoding methods that are associated with the plurality of data blocks and/or data packets;
(iii) operating the data processing arrangement to apply an inverse of the plurality of encoding methods to the encoded information of the plurality of data blocks and/or data packets to decode the encoded information of the plurality of data blocks and/or data packets to generate a plurality of decoded data blocks and/or data packets; and
(iv) operating the data processing arrangement to assemble the plurality of decoded data blocks and/or data packets based on the sizes and/or relative positions associated with the plurality of data blocks and/or data packets to generate the decrypted and decoded data (D3).

Optionally, the one or more encrypted portions are provided in a form of at least one compressed data stream, and the method includes operating the data processing arrangement to determine, from a first byte of the at least one compressed data stream, an entropy encoding method that is associated with the at least one compressed data stream.

Optionally, the method includes operating the data processing arrangement to determine the one or more encrypted portions and the one or more unencrypted sub-portions using at least one of: a new byte that is written at a beginning of an encrypted data stream, a most significant bit in an entropy encoding method byte and/or word, a knowledge of an order in which unencrypted and encrypted data streams are included in the encoded and encrypted data (E2), a flag bit.

Optionally, the method includes operating the data processing arrangement to decrypt and decode the encoded and encrypted data (E2) provided in a form of at least one of: encoded and encrypted one-dimensional data, encoded and encrypted multi-dimensional data, encoded and encrypted text data, encoded and encrypted binary data, encoded and encrypted sensor data, encoded and encrypted audio data, encoded and encrypted image data, encoded and encrypted video data.

In a sixth aspect, embodiments of the present disclosure provide a computer program product comprising a non-transitory (namely non-transient) computer-readable storage medium having computer-readable instructions stored thereon, the computer-readable instructions being executable by a computerized device comprising processing hardware to execute the aforementioned method.

In a seventh aspect, embodiments of the present disclosure provide a codec including the aforementioned encoder and the aforementioned decoder. For example, optionally a codec including at least one aforementioned encoder for encoding and encrypting input data to generate corresponding encoded and encrypted data, and at least one aforementioned decoder for decrypting and decoding the encoded and encrypted data to generate corresponding decrypted and decoded data$_{[z1]}$.

The aforementioned methods pursuant to embodiments of the present disclosure can be implemented with any suitable encoding arrangement, irrespective of which encryption algorithm is used. In doing so, the aforementioned methods do not alter a behavior of an encryption algorithm, which means that the protection provided by the encryption algorithm is not compromised.

The aforementioned methods make it possible to use a very fast, yet efficient encryption algorithm. In this regard, the aforementioned methods can be used in conjunction with an encryption algorithm in an efficient manner, without interfering with an inner operation of the encryption algorithm itself. Examples of encryption algorithms that are suitable for implementation with the aforementioned methods include, but are not limited to, AES, RSA, Twofish, Blowfish, Data Encryption Standard (DES), Triple DES (3-DES), Serpent, International Data Encryption Algorithm (IDEA), MARS, Rivest Cipher 6 (RC6), Camellia, CAST-128, Skipjack, eXtended Tiny Encryption Algorithm (XTEA), and so forth; these example names include registered trademarks.

The aforementioned methods pursuant to embodiments of the present disclosure provide a very fast and a considerably more efficient way of protecting data, when compared with known prior art methods. Notably, only one or more essential parts of encoded data are encrypted. For example, when images or video are coded with a Gurulogic Multi-Variate Codec (GMVC®) coding solution available from Gurulogic Microsystems Oy, only from a $\frac{1}{100}^{th}$ to a $\frac{1}{1000}^{th}$ part of the entire encoded data is protected with encryption, yet without a risk of compromising data security. Therefore, it can be concluded that using encryption in such a manner does not have any significant effect in a transfer rate of real-time videos, nor does it increase a consumption of computing resources in any significant manner.

Moreover, an additional advantage of the encryption process is that the encoded and encrypted data (E2) is not required to be transferred over networks with a protected, secure network connection, for example employing Virtual Private Network (VPN) tunneling, Secure Shell (SSH), or SSL/TLS protocols. Therefore, the aforementioned methods offer an advantageous model for transmitting text, binary, audio, image, video and other types of data, for example, in public Internet networks or in web services and cloud services.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and apparatus disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item.

DETAILED DESCRIPTION OF EMBODIMENTS

In the following detailed description, illustrative embodiments of the present disclosure and ways in which they can be implemented are elucidated. Although some modes of carrying out the present disclosure are described, those skilled in the art would recognize that other embodiments for carrying out or practicing the present disclosure are also possible.

In overview, embodiments of the present disclosure are concerned with encryption methods for partial data encryption, mutatis mutandis corresponding decryption methods. The aforesaid methods enable very fast encryption processes to be achieved, and provide very strong protection against unauthorized access.

The aforesaid methods beneficially use already-known encryption algorithms on already compressed or otherwise encoded one-dimensional or multi-dimensional text, binary, audio, image, video or other types of data. However, the methods also optionally use hitherto unknown encryption algorithms, for example encryption algorithms which are devised in future, as functioning of the methods is capable of being adapted to various encryption algorithms.

The partial data encryption described in the present disclosure works very efficiently in conjunction with various compression algorithms, which encode data based on its content, properties and composition. Such compression algorithms typically produce more than one data stream as output, at least one of which is essentially significant as regards the content of the data.

Embodiments of the present disclosure seek to provide a cost-efficient way to encrypt data, by encrypting only one or more most essential parts of the data. This saves on computing resources and processing energy expended by data processors, and decreases a time required for encryption, without weakening a degree of protection desired from the encryption. Such savings in energy expenditure is very beneficial on portable computing devices, for example smart phones, which enables smaller rechargeable batteries to be employed, or extended operating times to be achieved before battery recharging is required.

Throughout the present disclosure, unencrypted information is referred to as "plaintext", and correspondingly, encrypted information is referred to as "ciphertext".

Figure 1:
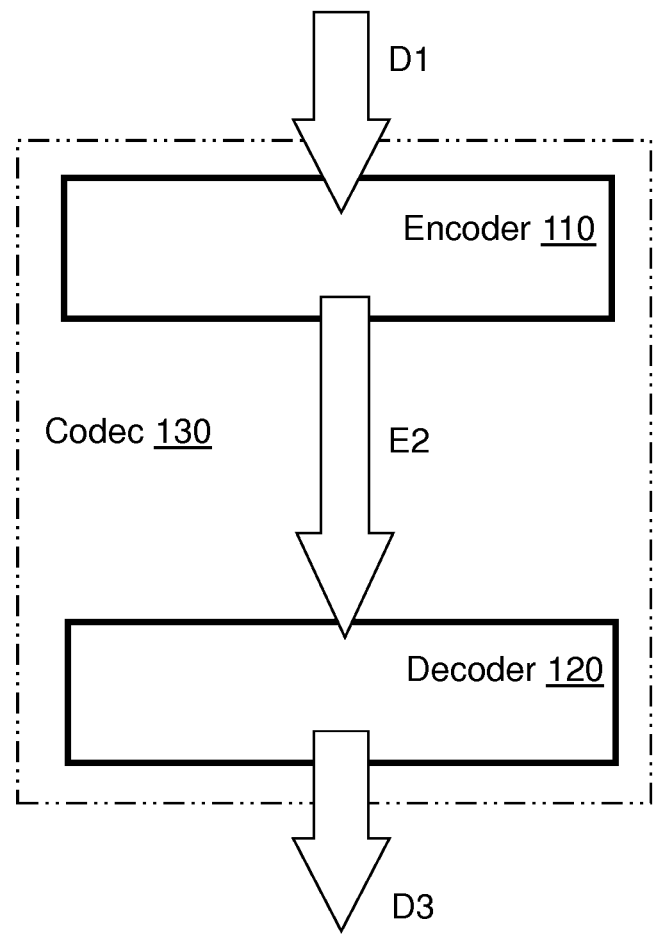
FIG. 1 is a schematic illustration of an encoder for encoding and encrypting input data (D1) to generate corresponding encoded and encrypted data (E2) and a decoder for decrypting and decoding the encoded and encrypted data (E2) to generate corresponding decrypted and decoded data (D3), wherein the encoder and the decoder collectively form a codec, in accordance with an embodiment of the present disclosure.

Referring to FIG. 1, embodiments of the present disclosure concern:

(i) an encoder 110 for encoding and encrypting input data (D1) to generate corresponding encoded and encrypted data (E2), and corresponding methods of encoding and encrypting the input data (D1) to generate the encoded and encrypted data (E2);

(ii) a decoder 120 for decrypting and decoding the encoded and encrypted data (E2) to generate corresponding decrypted and decoded data (D3), and corresponding methods of decrypting and decoding the encoded and encrypted data (E2) to generate the decrypted and decoded data (D3); and (iii) a codec 130 including a combination of at least one encoder and at least one decoder, for example a combination of the encoder 110 and the decoder 120.

Optionally, the decrypted and decoded data (D3) is exactly similar to the input data (D1), as in a lossless mode of operation. Alternatively, optionally, the decrypted and decoded data (D3) is approximately similar to the input data (D1), as in a lossy mode of operation. Yet alternatively, optionally, the decrypted and decoded data (D3) is different to the input data (D1), for example by way of a transformation, for example employed when transcoding data, but retains substantially similar information present in the input data (D1); for example, the decrypted and decoded data (D3) is usefully made different to the input data (D1) when reformatting of the decrypted and decoded data (D3) is also required, for example to be compatible with different types of communication platforms, software layers, communication devices, and so forth.

The encoder 110 includes a data processing arrangement for processing the input data (D1) to generate the corresponding encoded and encrypted data (E2). Optionally, the data processing arrangement of the encoder 110 is implemented by employing at least one Reduced Instruction Set Computing (RISC) processor that is operable to execute program instructions as will be elucidated in detail below.

Optionally, the data processing arrangement of the encoder 110 is operable to encode and encrypt the input data (D1) provided in a form of at least one of: one-dimensional data, multi-dimensional data, text data, binary data, sensor data, audio data, image data, video data, encoded data, but not limited thereto. Optionally, the input data (D1) is received as a stream or a file.

The data processing arrangement of the encoder 110 is operable to encode the input data (D1) to generate a plurality of intermediate encoded data streams.

Optionally, in order to encode the input data (D1), the data processing arrangement of the encoder 110 is operable to employ a plurality of split and/or combine operations to divide and/or combine the input data (D1) into a plurality of data blocks and/or data packets. In a first example, the input data (D1) is one-dimensional, and can be split using scan-lines. In a second example, the input data (D1) is multi-dimensional, and can be split into data blocks, depending on a number of dimensions the data blocks have.

In this regard, the encoder 110 is beneficially useable with other known encoders; for example, in conjunction with a block encoder as described in a granted UK patent GB2503295B which is hereby incorporated herein by reference. The block encoder can be used to split and/or combine in an optimal manner the input data (D1) into the plurality of data blocks and/or data packets.

In the first example where the input data (D1) is one-dimensional, the data blocks are extracted from the input data (D1) by splitting an incoming stream, namely, a byte string, into shorter streams. For example, indices of pixels in a 6×4 image obtained after a regular scanning, namely, scanning first from left to right and then from top to bottom, may be represented as follows:

01 02 03 04 05 06
07 08 09 10 11 12
13 14 15 16 17 18
19 20 21 22 23 24

These indices, when delivered in one-dimensional form for encoding, yield a line combined byte string, which may be represented as follows:

01 02 03 04 05 06 07 08 09 10 11 12 13 14 15 16 17 18 19 20 21 22 23 24

The byte string may, for example, be split into shorter byte strings of four bytes, which may be represented as follows:

(01 02 03 04)
(05 06 07 08)
(09 10 11 12)
(13 14 15 16)
(17 18 19 20)
(21 22 23 24)

In the second example, for illustration purposes, the input data (D1) is a two-dimensional (2D) image. In this example, the 2D image is optionally split into smaller 2×2 areas, and indices of pixels in the 2D image may be reorganized as byte strings of four bytes by using a regular scanning order on the 2×2 areas of the 2D image. These byte strings may be represented as follows:

(01 02 07 08)
(03 04 09 10)
(05 06 11 12)
(13 14 19 20)
(15 16 21 22)
(17 18 23 24)

Furthermore, in some examples, the input data (D1) can be three-dimensional (3D), for example as in 3D-video content. In other examples, there can be more dimensions in the input data (D1), for example, such as time in videos.

Likewise, when the input data (D1) is audio data, a similar splitting process can be executed. In an example, the audio data optionally includes audio signals from multiple microphones. In such a case, the audio data can be split in a manner that individual audio signals are separated, and then split further into data packets.

Once the input data (D1) is split into the plurality of data blocks and/or data packets, the data processing arrangement of the encoder 110 is optionally operable to perform a statistical analysis and/or an iterative analysis of the plurality of data blocks and/or data packets to determine a plurality of parameters that are indicative of statistical variation within their respective data blocks and/or data packets. The data processing arrangement of the encoder 110 is then optionally operable to employ the plurality of parameters to select one or more encoding methods to be used to encode information of the plurality of data blocks and/or data packets.

Subsequently, the data processing arrangement of the encoder 110 is operable to employ the one or more encoding methods for encoding the information of the plurality of data blocks and/or data packets into at least one of the plurality of intermediate encoded data streams.

Optionally, the data processing arrangement of the encoder 110 is operable to employ one or more entropy-encoding methods for compressing the plurality of data blocks and/or data packets into a plurality of entropy-encoded data blocks and/or data packets for inclusion in the at least one of the plurality of intermediate encoded data streams. Such entropy encoding is optionally performed after the plurality of data blocks and/or data packets are encoded using the aforementioned encoding methods. Regarding such compression, it will be appreciated that it is the aim of the aforementioned entropy-encoding methods to compress the data (D1), when generating the encoded data (E2), and the methods are often successful at achieve such data compression, but not always. In either case, a given entropy-encoding method applied, in embodiments of the present disclosure, needs to be included in the intermediate encoded data stream, often with the length of the data that is entropy-encoded, and sometimes also with the length of the data prior to its entropy-encoding being executed.

It will be appreciated that one or more of the plurality of intermediate encoded data streams are critical and essential for decoding correctly one or more remaining data streams of the plurality of intermediate encoded data streams. The one or more of the plurality of intermediate encoded data streams that are critical and essential are hereinafter referred to as "critical data streams". The one or more remaining data streams of the plurality of intermediate encoded data streams are hereinafter referred to as "non-critical data streams".

Optionally, the critical data streams of the plurality of intermediate encoded data streams include information indicative of at least one of:
(i) the plurality of split and/or combine operations that are employed to divide and/or combine the input data (D1) into the plurality of data blocks and/or data packets,
(ii) the one or more encoding methods that are employed for encoding the information of the plurality of data blocks and/or data packets,
(iii) the one or more entropy-encoding methods that are employed for entropy-encoding the plurality of data blocks and/or data packets, and/or
(iv) a length of the plurality of entropy-encoded data blocks and/or data packets in the entropy-encoded data streams, and/or
(v) a length of the plurality of data blocks and/or data packets prior to entropy-coding being applied.

Thus, the critical data streams represent only a part of the plurality of intermediate encoded data streams. The critical data streams are typically in a range of a $\frac{1}{100}^{th}$ to a $\frac{1}{1000}^{th}$ part of the entire intermediate encoded data streams.

Optionally, the non-critical data streams include information indicative of at least one of: database reference values, values of Discrete Cosine Transform (DCT) parameters, values of DC coefficients, slide values, line values, scale values, multilevel values, and/or masks, but not limited thereto.

Moreover, as mentioned earlier, the critical data streams are an essential part of the plurality of intermediate encoded data streams, without which it would be impossible to decode correctly the non-critical data streams of the plurality of intermediate encoded data streams. Therefore, in order to safeguard the plurality of intermediate encoded data streams from unauthorized access, at least one of the critical data streams is beneficially encrypted as elucidated in greater detail below.

Moreover, optionally, the data processing arrangement of the encoder 110 is operable to generate or receive at least one key for use in encrypting the at least one of the critical data streams.

Optionally, in one implementation, the data processing arrangement of the encoder 110 is supplied in operation with the at least one key.

Alternatively, in another implementation, the data processing arrangement of the encoder 110 is optionally operable to generate the at least one key using a suitable key generation algorithm. For this purpose, the data processing arrangement of the encoder 110 is optionally operable to apply key stretching to generate the at least one key. Optionally, the key stretching includes repetitively subjecting an associated password through a one-way digest algorithm (namely, a hash algorithm) multiple times.

Moreover, optionally, the data processing arrangement of the encoder 110 is operable to use the at least one key to encrypt the at least one of the critical data streams using one or more encryption algorithms to generate at least one intermediate encrypted data stream. Optionally, the data processing arrangement of the encoder 110 is operable to apply at least one initialization vector ("Init Vector"; IV) in conjunction with the at least one key when encrypting the at least one of the critical data streams.

Subsequently, the data processing arrangement of the encoder 110 is operable to merge unencrypted portions of the plurality of intermediate encoded data streams, including the unencrypted non-critical data streams, together with the at least one intermediate encrypted data stream to generate the encoded and encrypted data (E2).

Furthermore, optionally, the data processing arrangement of the encoder 110 is operable to compress the at least one of the critical data streams into at least one compressed data stream prior to encryption. Likewise, optionally, the data processing arrangement of the encoder 110 is operable to compress the non-critical data streams into one or more other compressed data streams for inclusion in the encoded and encrypted data (E2).

Optionally, the data processing arrangement of the encoder 110 is operable to compute a first byte of the at least one compressed data stream such that the first byte describes an entropy encoding method that is employed for compressing the at least one of the critical data streams. Likewise, optionally, the data processing arrangement of the encoder 110 is operable to compute first bytes of the one or more other compressed data streams, such that these first bytes describe entropy encoding methods that are employed for compressing the non-critical data streams.

Optionally, when the at least one of the critical data streams, namely the at least one compressed data stream, is encrypted to generate an encrypted data stream, a new byte that defines encryption as one entropy encoding method is written at a beginning of the encrypted data stream. When the new byte is read during subsequent decrypting and decoding at the decoder 120, the decoder 120 notices that the data stream is encrypted. Accordingly, the decoder 120 decrypts the encrypted data stream into the at least one compressed data stream, and reads an actual entropy encoding method from the first byte of the at least one compressed data stream. This enables decompression of the at least one compressed data stream.

Alternatively, optionally, instead of delivering the new byte that defines encryption, information about the encryption employed, the new byte is combined with information about the employed entropy encoding method, for example, by using a Most Significant Bit (MSB) in an entropy encoding method byte and/or word.

Yet alternatively, optionally, the encoder 110 is operable to communicate, to the decoder 120, an order in which the unencrypted and encrypted data streams are included in the encoded and encrypted data (E2), and information about the at least one of the critical data streams that is encrypted.

Still alternatively, optionally, one or more flag bits are used to indicate which data streams contain the encoded information (namely, the non-critical data streams) and which data streams do not contain the encoded information (namely, the critical data streams).

Optionally, information indicative of a length of the at least one compressed data stream is provided after the first byte. This enables the decoder 120 to read the length of the at least one compressed data stream, possibly to copy its content to its own buffer, and to jump to read a next data stream. Optionally, the information indicative of the length is left unencrypted. Alternatively, optionally, a new length of the encrypted data stream is written after the new byte. Yet alternatively, optionally, the first bytes are encrypted in the encoder 110 and subsequently decrypted in the decoder 120, and then the length of the at least one compressed data stream can be read in the decoder 120 without decrypting and decoding the entire encoded and encrypted data (E2).

In an alternative implementation, the at least one of the critical data streams can be first encrypted, and then be compressed. However, it will be appreciated that performing compression of the at least one of the critical data streams prior to encrypting is advantageous, as the at least one of the critical data streams often includes considerable redundant data. Thus, the data processing arrangement of the encoder 110 is operable to employ a suitable entropy encoding method to compress the at least one of the critical data streams. In such a case, an entropy and a data size of the encoded and encrypted data (E2) are smaller than that when the at least one of the critical data streams were encrypted before compression. The one or more encryption algorithms typically tend to produce maximum data entropy in the encoded and encrypted data (E2), which mathematically means that there are as many alternatives for deciphering the encoded and encrypted data (E2) as is theoretically possible.

As an example, a Gurulogic Multi-Variate Codec (GMVC®) coding solution available from Gurulogic Microsystems Oy is beneficially used in combination with embodiments of the present disclosure. The GMVC® coding solution is able to encode different types of data very efficiently, while producing several different data streams that contain an entire information of an original input, namely the input data (D1), efficiently in an entropy-encoded manner. For example, in the aforementioned proprietary GMVC® coding solution, encoding of image data or video data employs mutually different encoding methods to produce various different data streams, depending on a format and content of the input data (D1). Therefore, it is advantageous that different types of data are encoded and compressed efficiently with different encoding and entropy encoding methods that are optimal for precisely those types of data, while taking into account a bit count and an entropy of the input data (D1). The compression reduces the size of the data. This means that a smaller amount of data needs to be encrypted, and an encryption process is thus faster.

Moreover, when encoding the image data or the video data, the GMVC® coding solution produces a data stream, for example typical to a block encoder, that includes information indicative of the plurality of splits and/or combinations, namely split and/or combine decisions, employed for dividing and/or combining the input data (D1) into the plurality of data blocks and/or data packets. This data stream is hereinafter referred to as a "split/combine-information data stream". The split/combine-information data stream typically ranges from a $\frac{1}{200}^{th}$ to a $\frac{1}{2000}^{th}$ part of the entire intermediate encoded data streams, in terms of data size. The split/combine-information data stream is one of the most essential parts of the intermediate encoded data streams, because it defines sizes and/or relative positions of the plurality of data blocks and/or data packets. In some embodiments, decoding of the non-critical data streams is often possible to perform only after the sizes of the plurality of data blocks and/or data packets are known. In other embodiments where encoded information of data blocks and/or data packets of different sizes are provided separately in different data streams, the decoding of the non-critical data streams is possible only after the relative positions of these data blocks and/or data packets are known.

Moreover, as the GMVC® coding solution executes the one or more encoding methods on the plurality of data blocks and/or data packets, the GMVC® coding solution produces another data stream that includes information indicative of the one or more encoding methods employed for encoding information of the plurality of data blocks and/or data packets. This data stream is hereinafter referred to as an "encoding-method data stream". The encoding-method data stream also typically ranges from a $\frac{1}{100}^{th}$ to a $\frac{1}{1000}^{th}$ part of the entire intermediate encoded data streams, in terms of size, and is one of the most essential parts of the intermediate encoded data streams.

Optionally, different encoding-method data streams are produced for data blocks and/or data packets of different sizes.

Additionally, optionally, the input data (D1) is divided into data blocks and/or data packets of different sizes, for example, based on the content of the input data (D1) and a desired quality of encoding. Typically, for a better quality of encoding, the input data (D1) is divided into data blocks and/or data packets of smaller sizes, and vice versa.

Apart from the split/combine-information data stream and the encoding-method data stream, the GMVC® coding solution produces other data streams, for example, pertaining to at least partial reoccurrences of data blocks and/or data packets in the image data or the video data. The other data streams typically include data values of data elements in the plurality of data blocks and/or data packets. However, these other data streams do not provide information about sizes and relative positions of data blocks and/or data packets, and encoding methods that are employed to encode the information of the data blocks and/or data packets.

Therefore, the split/combine-information data stream and the encoding-method data stream are essential and critical for an encoding process performed by the encoder 110, and are protected together or separately via the encryption process. As a result, only from a $\frac{1}{100}^{th}$ to a $\frac{1}{1000}^{th}$ part of computing resources and processing energy are expended, when compared to a known prior-art solution where all the data streams would be encrypted. Thus, the encryption process is very fast, irrespective of whether or not there is a dedicated encryption circuit available.

Furthermore, when the split/combine-information data stream and/or the encoding-method data stream are encrypted, an unauthorized eavesdropping third party cannot understand how the other data streams should be used, and how and where data blocks and/or data packets should be positioned.

However, there can arise situations where the data blocks and/or data packets are of equal size, and thus, multiple encoding methods are not used in encoding the data blocks and/or data packets. It can also occur that the data blocks and/or data packets are not split and/or combined at all, because the data blocks and/or data packets are already of a predetermined minimum/maximum size, and thus, there is no split/combine information to be encrypted. In these kinds of situations, it is potentially possible for a malicious third party to decipher how and where the data blocks and/or data packets should be positioned. Therefore, alternative options are optionally employed in embodiments of the present disclosure. Optional streams to be encrypted relate to the one or more entropy-encoding methods and the length of the plurality of entropy-encoded data blocks and/or data packets, the length differing from that of the plurality of data blocks and/or data packets prior to entropy-encoding being applied.

Indeed, as the GMVC® coding solution executes the one or more entropy-encoding methods on the plurality of data blocks and/or data packets, the GMVC® coding solution produces another data stream that includes information that is indicative of the one or more entropy-encoding methods employed for entropy coding the plurality of data blocks and/or data packets into the plurality of entropy-encoded data blocks and/or data packets. This data stream is hereinafter referred to as an "entropy-encoding method data stream". The entropy-encoding method data stream typically comprises less than a $1/1000^{th}$ part of the entire intermediate encoded data streams, in terms of size, and can thus be efficiently used in the aforementioned method pursuant to embodiments of the present disclosure.

Moreover, as the GMVC® coding solution executes the one or more entropy-encoding methods on the plurality of data blocks and/or data packets, the GMVC® coding solution produces yet another data stream that includes information indicative of the length of the plurality of entropy-encoded data blocks and/or data packets in the entropy-encoded data streams. This data stream is hereinafter referred to as an "entropy-encoded data length stream". As the length of the entropy-encoded data is typically different from the length of the original data, it is impossible for a third party to try to reconstruct the unencrypted data. Moreover, the size of the length information is typically very small, compared to the actual data, so it is beneficial to encrypt only the length information, together with information indicative of the one or more entropy-encoding methods that have been employed, instead of encrypting the whole data.

It should be appreciated that often the length of the data prior entropy-encoding is already known, but sometimes it is not and then it needs to be delivered to the decoder, for example by including the information to the intermediate encoded data stream to be encrypted, so that the decoding can be executed irrespective of other data and their contents. Further, even though the length of the entropy-encoded data could also be expressed/delivered as a difference between the length of the original data (that is, prior entropy-encoding) and the entropy-encoded data, it is often not beneficial to do so. Instead, for the sake of simplicity and keeping the data amount low it is often beneficial to deliver that information as the actual length information. For illustration purposes only, there is now described an example where image data (D1) has been encoded with the aforementioned GMVC® coding solution, and from the entire intermediate encoded data streams, only the split/combine-information data stream and the encoding-method data stream are encrypted with a very strong encryption key created with RSA to generate encoded and encrypted data (E2). RSA is a well-known public-key encryption algorithm. Moreover, it is assumed in this example that an unauthorized eavesdropping third party having an access to the encoded and encrypted data (E2) attempts to decipher the encrypted data streams and the other data streams of the encoded and encrypted data (E2). Furthermore, it is assumed that the unauthorized third party knows a format of the image data (D1), because the image data (D1) was encoded with the GMVC® coding solution. As a result, the unauthorized third party is able to decompress all of the other data streams, which range from a $99/100^{th}$ to a $999/1000^{th}$ part of encoded and encrypted data (E2). However, the unauthorized third party is unable to decipher the encrypted data streams, and therefore, is unable to decipher the encoded and encrypted data (E2).

It is theoretically possible for a malicious third party to make an attempt to decipher the encoded and encrypted data (E2) in such a way that all possible splitting/combining alternatives are tried for all possible encoding method alternatives. However, in such a case, an amount of computing resources and a time required in attempting to break the encryption and to decipher the encoded and encrypted data (E2) would be considerable, and would present a novel challenge to cryptanalysts.

Furthermore, optionally, the encoder 110 is operable to communicate the encoded and encrypted data (E2) to a data server and/or data storage (not shown in FIG. 1) for storing in a database (not shown in FIG. 1). The data server and/or data storage is arranged to be accessible to the decoder 120, which is beneficially compatible with the encoder 110, for subsequently decrypting and decoding the encoded and encrypted data (E2).

Additionally, optionally, the encoder 110 is operable to communicate the at least one key and/or the IV to the data server and/or data storage for storing in the database.

In some examples, the decoder 120 is optionally operable to access the encoded and encrypted data (E2) from the data server and/or data storage. Additionally, optionally, the decoder 120 is operable to access the at least one key and/or the IV from the data server and/or data storage and/or another data server.

In alternative examples, the encoder 110 is optionally operable to stream the encoded and encrypted data (E2) to the decoder 120, either via a communication network or via a direct connection. Moreover, it is to be noted that a device equipped with a hardware-based or software-based encoder can also communicate directly with another device equipped with a hardware-based or software-based decoder. Although embodiments of the present disclosure are described as utilizing computing hardware which is operable to execute computing instructions, it is feasible to implement embodiments of the present disclosure in dedicated hardware, for example via an application-specific integrated circuit (ASIC) and/or via use of a field-programmable gate array (FPGA). Such hardwire implementations are useful, for example, for implementing very robust encryption in devices which may be susceptible to ionizing radiation exposure, for example in space-based equipment such as satellites.

In yet other alternative examples, the decoder 120 is optionally implemented so as to retrieve the encoded and encrypted data (E2) from a non-transitory (namely non-transient) computer-readable storage medium, such as a hard drive and a Solid-State Drive (SSD).

Moreover, optionally, the data processing arrangement of the encoder 110 is operable to arrange for delivery of the at least one key from the encoder 110 to the decoder 120, for use in subsequent decrypting and decoding of the encoded and encrypted data (E2). Optionally, the at least one key is delivered from the encoder 110 to the decoder 120 manually between respective users thereof. Alternatively, optionally, the at least one key is delivered from the encoder 110 to the decoder 120 via an encrypted e-mail, for example, such as via an e-mail that is encrypted using Pretty Good Privacy (PGP), GNU Privacy Guard (GnuPG), or similar. Yet alternatively, optionally, the at least one key is delivered from the encoder 110 to the decoder 120 via an encrypted communication connection. Optionally, the encrypted communication connection is implemented via Secure Sockets Layer (SSL)/Transport Layer Security (TLS).

The decoder 120 includes a data processing arrangement for processing the encoded and encrypted data (E2) to generate the corresponding decrypted and decoded data (D3). Optionally, the data processing arrangement of the decoder 120 is implemented by employing at least one RISC processor that is operable to execute program instructions as will be elucidated in detail later; such a RISC processor is capable of performing relatively simpler concatenated operations at a very high speed, and is suitable for decoding data provided in a streamed format, for example in real-time. Such data provided in a streamed format includes, for example, video information, remote surveillance video information and/or video conferencing information.

Optionally, the data processing arrangement of the decoder 120 is operable to decrypt and decode the encoded and encrypted data (E2) provided in a form of at least one of: encoded and encrypted one-dimensional data, encoded and encrypted multi-dimensional data, encoded and encrypted text data, encoded and encrypted binary data, encoded and encrypted sensor data, encoded and encrypted audio data, encoded and encrypted image data, encoded and encrypted video data, but not limited thereto.

The data processing arrangement of the decoder 120 is operable to process the encoded and encrypted data (E2) to determine one or more encrypted sub-portions and one or more unencrypted sub-portions thereof. The one or more unencrypted sub-portions of the encoded and encrypted data (E2) include the non-critical data streams, namely the encoded information of the plurality of data blocks and/or data packets.

Optionally, the determination of the encrypted sub-portions is made based on the aforementioned first byte. Alternatively, optionally, the determination can be made based on the aforementioned MSB in an entropy encoding method byte and/or word that includes information about the encryption and the employed entropy encoding method. Yet alternatively, optionally, the determination is made based on a knowledge of the order in which the unencrypted and encrypted data streams are included in the encoded and encrypted data (E2). Still alternatively, optionally, the determination is made based on the aforementioned flag bits that indicate which data streams contain the encoded information and which data streams do not contain the encoded information.

Optionally, the data processing arrangement of the decoder 120 is supplied in operation with the at least one key for use in generating the decrypted and decoded data (D3). Optionally, using the at least one key, the data processing arrangement of the decoder 120 is operable to decrypt the one or more encrypted sub-portions to determine the sizes, the relative positions and/or the one or more encoding methods that are associated with the plurality of data blocks and/or data packets. Optionally, the data processing arrangement of the decoder 120 is also operable to determine the one or more entropy-encoding methods that are associated with the plurality of data blocks and/or data packets.

Optionally, the data processing arrangement of the decoder 120 is operable to decrypt the one or more encrypted sub-portions using at least one initialization vector ("Init Vector", IV) in combination with the at least one key. As described earlier, the at least one initialization vector is supplied in operation to the decoder 120.

Moreover, optionally, the one or more encrypted sub-portions are provided in a form of at least one compressed data stream. In such a case, the data processing arrangement of the decoder 120 is optionally operable to determine, from a first byte of the at least one compressed data stream, an entropy encoding method that is associated with the at least one compressed data stream.

Additionally, optionally, information indicative of a length of the at least one compressed data stream is provided at a beginning of the at least one compressed data stream, for example, after a first byte thereof. As a result, the data processing of the decoder 120 is provided with information regarding an amount of data to be decoded by decrypting only the beginning of the at least one compressed data stream, without having to decrypt it all. This is particularly beneficial for purposes of parallel processing, namely parallel decoding of data streams.

The data processing arrangement of the decoder 120 is then optionally operable to apply an inverse of the entropy encoding method to decompress the at least one compressed stream to determine the aforesaid sizes, the aforesaid relative positions and the one or more encoding methods that are associated with the plurality of data blocks and/or data packets.

The data processing arrangement of the decoder 120 is then operable to apply an inverse of the one or more encoding methods to the encoded information of the plurality of data blocks and/or data packets to decode the encoded information of the plurality of data blocks and/or data packets to generate a plurality of decoded data blocks and/or data packets. Optionally, the data processing arrangement of the decoder 120 is also operable to apply an inverse of the one or more entropy-encoding methods to a plurality of entropy-encoded data blocks and/or data packets included in the one or more unencrypted sub-portions of the encoded and encrypted data (E2), prior to applying the inverse of the one or more encoding methods.

Subsequently, the data processing arrangement of the decoder 120 is operable to assemble the plurality of decoded data blocks and/or data packets based on the sizes and/or relative positions to generate the decrypted and decoded data (D3).

It will be appreciated that information indicative of the aforesaid sizes, the aforesaid relative positions and/or the one or more encoding methods that are associated with the plurality of data blocks and/or data packets is included within the encrypted sub-portions in an encrypted manner. Thus, decoding the encoded information of the plurality of data blocks and/or data packets to generate the decrypted and decoded data (D3) requires decrypting the encrypted sub-portions of the encoded and encrypted data (E2) correctly.

FIG. 1 is merely an example, which does not unduly limit the scope of the claims herein. It is to be understood that the specific designation for the codec 130 is provided as an example and is not to be construed as limiting the codec 130 to specific numbers, types, or arrangements of encoders and decoders. A person skilled in the art will recognize many variations, alternatives, and modifications of embodiments of the present disclosure.

Optionally, the codec 130 is implemented within a single device. Alternatively, optionally, the codec 130 is effectively implemented between multiple devices. Optionally, the codec 130 is implemented as custom-design digital hardware, for example via use of one or more Application-Specific Integrated Circuits (ASIC's). Alternatively, or additionally, the codec 130 is implemented in computer software instructions executable upon computing hardware.

The codec 130 can be implemented as at least one of: a data codec, an audio codec, an image codec and/or a video codec, but not limited thereto.

Moreover, the codec 130 can be implemented to provide a secure communication between senders and receivers, while considerably saving network bandwidth required for data transfer, and without requiring an encrypted communication connection, such as SSL/TLS, for data transfer. In an example, the codec 130 can be implemented in such systems that are based on request-response type communications, such as HyperText Transfer Protocol (HTTP) that is used in web browsers and World Wide Web (www) servers for data transfer.

Although it is probable that data encrypted today can be broken into and decrypted by using a "brute force attack" technique in the future, it is envisaged that future encryption algorithms will correspondingly generate stronger encryption keys than current encryption algorithms, thus still ensuring strong encryption of data.

In addition to the "brute force attack" technique, there are other well-known attack techniques, such as "biclique attack", "related-key attack", "padding oracle attack", "length extension attack" techniques and so forth, but these techniques essentially fail in breaking the encryption performed by the encoder 110.

For illustration purposes only, there is next provided a technical example of an encrypting process as executed within the encoder 110. In this example, one generally efficient model is presented for encrypting an unencrypted plaintext data stream by using a symmetric Advanced Encryption Standard (AES) encryption algorithm in a Cipher-Block Chaining (CBC) mode with an expanded encryption key pursuant to following steps:

1. Obtaining or generating two encryption keys, namely Key1 and Key2;
2. Generating cryptographic pseudo-random Initialization Vector (IV) bytes for AES CBC;
3. Encrypting Plaintext bytes (namely, the at least one of the critical data streams) to Ciphertext bytes (namely, the at least one intermediate encrypted data stream) using AES CBC function with Key1 and IV;
4. Merging IV and Ciphertext bytes;
5. Creating Message Authentication Code (MAC) bytes using HMAC function with Key2 and Ciphertext; and
6. Writing MAC and Ciphertext bytes to data stream, namely to the one or more encrypted sub-portions of the encoded and encrypted data (E2).

Moreover, a pseudo code for the aforementioned algorithm is presented as follows:

Key1=KeyStretch(GetKey( ))
   Key2=KeyStretch(GetKey( ))
   IV=Random( )
   Ciphertext=IV+AES(Key1, IV, Plaintext)
   MAC=HMAC(Key2, Ciphertext)
   DATA=MAC+Ciphertext In the example above, two strengthened keys have been created using a "key stretching" technique. The "key stretching" technique is typically implemented by running a password for encrypting thousands of times through a one-way digest algorithm, namely a hashing algorithm. This creates enough permutations to protect the password from attacks, for example, such as key-related attacks.

Thereafter, corresponding random Initialization Vector (IV) bytes are created for the CBC mode. These IV bytes are then scrambled and blended into one or more first bytes of the Plaintext bytes, namely the at least one of the critical data streams to be encrypted. The at least one of the critical data streams is then encrypted using the symmetric AES encryption algorithm in the CBC mode with a multiply expanded key and IV bytes.

Using the IV bytes is particularly beneficial for purposes of improving a degree of protection of the encryption thereby obtained, for example, in cases where the at least one of the critical data streams contains a lot of redundant data. As a result, an intruding attacker cannot decrypt the at least one of the critical data streams before an entire sequence of information has been broken from start to finish.

Finally, Message Authentication Code (MAC) bytes are inserted into the Ciphertext bytes, namely into the at least one intermediate encrypted data stream. This prevents possibly identical ciphertext caused by possibly occurring redundant plaintext in the at least one of the critical data streams, and also prevents the encryption from being broken, for example via a "padding oracle attack" technique. This also ensures that the integrity of the one or more encrypted sub-portions of the encoded and encrypted data (E2) is intact.

Figure 2:
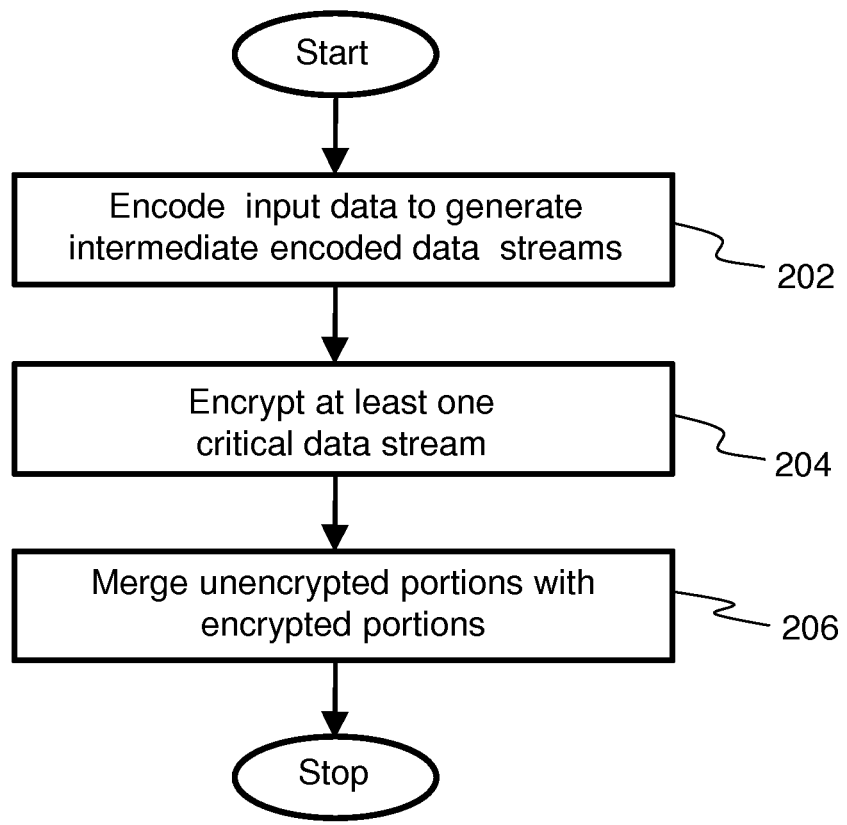
FIG. 2 is a schematic illustration of a flow chart depicting steps of a first method of encoding and encrypting input data (D1) to generate corresponding encoded and encrypted data (E2), in accordance with an embodiment of the present disclosure.

Referring now to FIG. 2, there is provided a flow chart depicting steps of a first method of encoding and encrypting input data (D1) to generate corresponding encoded and encrypted data (E2), in accordance with an embodiment of the present disclosure. The method is depicted as a collection of steps in a logical flow diagram, which represents a sequence of steps that can be implemented in hardware, software, or a combination thereof, for example as aforementioned.

For illustration purposes only, the first method will next be illustrated with reference to the encoder 110 depicted in FIG. 1.

At a step 202, the data processing arrangement of the encoder 110 encodes the input data (D1) to generate a plurality of intermediate encoded data streams.

Optionally, the step 202 includes sub-steps at which the data processing arrangement of the encoder 110 employs a plurality of split and/or combine operations to divide and/combine the input data (D1) into a plurality of data blocks and/or data packets, and employs one or more encoding methods for encoding information of the plurality of data blocks and/or data packets into at least one of the plurality of intermediate encoded data streams.

Optionally, the step 202 includes a sub-step at which the data processing arrangement of the encoder 110 employs one or more entropy-encoding methods for compressing the plurality of data blocks and/or data packets into a plurality of entropy-encoded data blocks and/or data packets, wherein information indicative of those methods, or an implementation of those methods, is included in the at least one of the plurality of intermediate encoded data streams together with length of the entropy-encoded data and optionally also length of the original data; the information indicative of those methods, or the implementation of those methods, and the length information are beneficially included in their own intermediate data streams. Such entropy encoding is optionally performed after one or more data blocks and/or data packets are encoded using the aforementioned encoding methods. Optionally, at this phase, the produced intermediate encoded data streams can be further compressed prior to them being encrypted. Next, at a step 204, the data processing arrangement of the encoder 110 encrypts at least one critical data stream of the plurality of intermediate encoded data streams using one or more encryption algorithms to generate at least one intermediate encrypted data stream. Optionally, the at least one critical data stream includes information indicative of at least one of: the plurality of split and/or combine operations, the one or more encoding methods, the one or more entropy-encoding methods, and/or a length of the plurality of entropy-encoded data blocks and/or data packets, and/or a length of the data blocks and/or packets prior to entropy-encoding being applied.

Optionally, at the step 204, the data processing arrangement of the encoder 110 applies at least one initialization vector ("Init Vector"; IV) in conjunction with at least one key when encrypting the at least one critical data stream.

Figure 3:
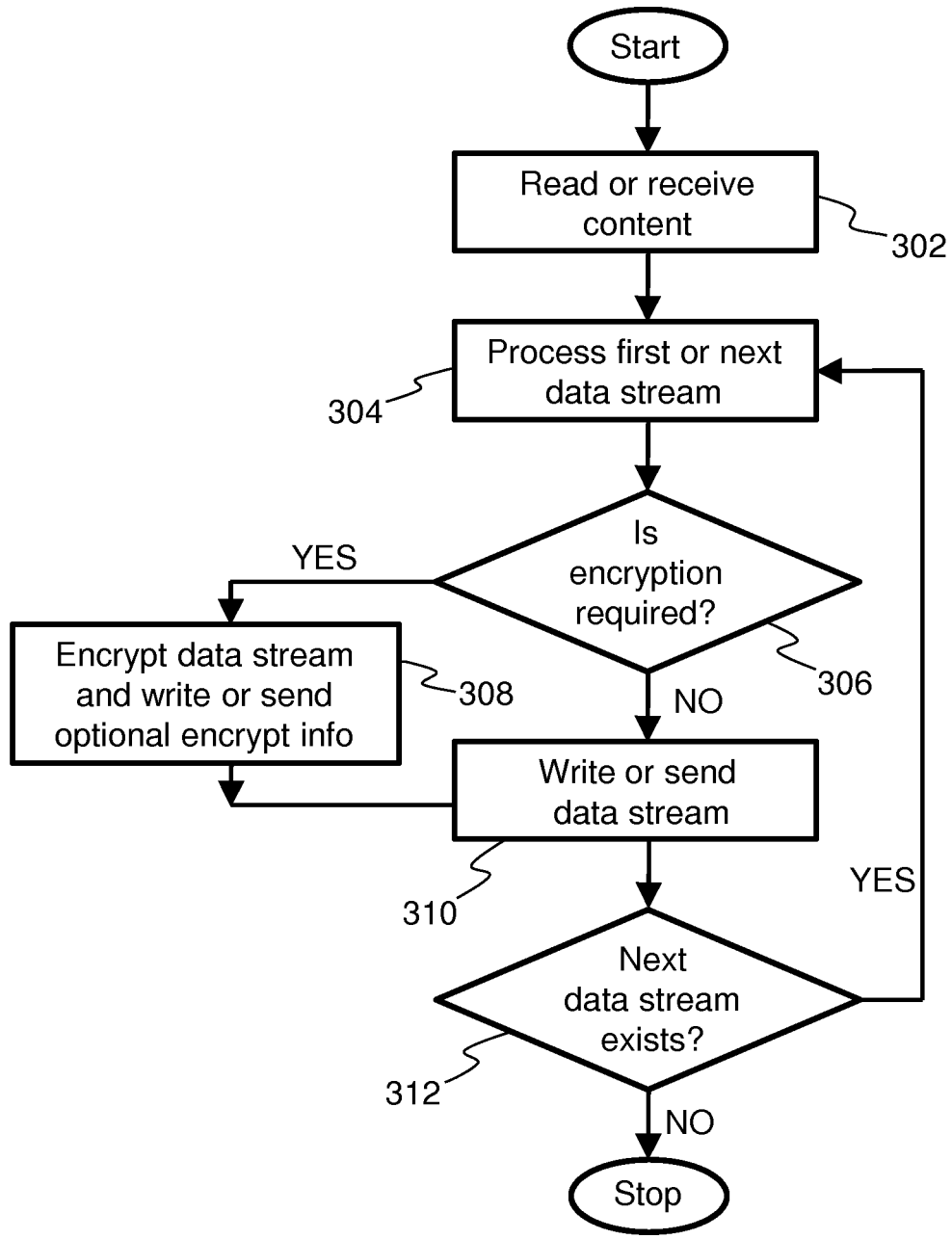
FIG. 3 is a schematic illustration of steps of an encrypting process, in accordance with an embodiment of the present disclosure.

An encrypting process of the step 204 has been described in conjunction with FIG. 3.

Subsequently, at a step 206, the data processing arrangement of the encoder 110 merges unencrypted portions of the plurality of intermediate encoded data streams, namely the encoded information of the plurality of data blocks and/or data packets, together with the at least one intermediate encrypted data stream to generate the encoded and encrypted data (E2).

The steps 202 to 206 are only illustrative and other alternatives can also be provided where one or more steps are added, one or more steps are removed, or one or more steps are provided in a different sequence without departing from the scope of the claims herein. For example, optionally, the method includes an additional step in which the data processing arrangement of the encoder 110 compresses the at least one critical data stream into at least one compressed data stream prior to encryption. Optionally, in the additional step, the data processing arrangement of the encoder 110 computes a first byte of the at least one compressed data stream such that the first byte describes an entropy encoding method that is employed for compressing the at least one critical data stream.

Moreover, the step 204 is optionally performed using the CBC mode of the symmetric AES encryption algorithm. The step 204 is optionally performed using a randomly-generated IV, which is merged with the at least one key. It will be appreciated that the step 204 can be performed using other encryption algorithms, irrespective of whether or not IV is used for encrypting the at least one critical data stream, and irrespective of whether or not the CBC mode is used.

Alternatively, optionally, the input data (D1) is already encoded. In such a case, the method starts at an alternative step where the at least one critical data stream is identified and then encrypted. Such identification is optionally performed by processing the input data (D1) stream-by-stream and identifying one or more critical data streams therein. This process is fast and efficient when each data stream of the input data (D1) includes information of an encoding method employed as well as a length of that data stream.

FIG. 3 is a schematic illustration of steps of the encrypting process, in accordance with an embodiment of the present disclosure.

At a step 302, the data processing arrangement of the encoder 110 reads or receives content of the plurality of intermediate encoded data streams.

At a step 304, the data processing arrangement of the encoder 110 processes a first or a next data stream of the plurality of intermediate encoded data streams.

At a step 306, the data processing arrangement of the encoder 110 determines whether or not the first or the next data stream processed at the step 304 is required to be encrypted.

If, at the step 306, it is determined that the first or the next data stream is required to be encrypted, a step 308 is performed. Otherwise, if it is determined that the first or the next data stream is not required to be encrypted, a step 310 is performed.

At the step 308, the data processing arrangement of the encoder 110 encrypts the first or the next data stream. In accordance with the step 308, the data processing arrangement of the encoder 110 optionally writes or sends encryption information, namely information indicative of one or more encryption algorithms employed at the step 308.

Thereafter, at the step 310, the data processing arrangement of the encoder 110 writes or sends the encrypted data stream for inclusion in the encoded and encrypted data (E2).

When the first or the next data stream is not encrypted, the data processing arrangement of the encoder 110 writes or sends the first or the next data stream as it is, at the step 310.

Next, at a step 312, the data processing arrangement of the encoder 110 determines whether or not a next data stream exists in the input data (D1). If it is determined that a next data stream exists, the encrypting process restarts at the step 302. Otherwise, if it is determined that no next data stream exists in the input data (D1), the encrypting process stops.

The steps 302 to 312 are only illustrative and other alternatives can also be provided where one or more steps are added, one or more steps are removed, or one or more steps are provided in a different sequence without departing from the scope of the claims herein.

Embodiments of the present disclosure provide a computer program product comprising a non-transitory (namely non-transient) computer-readable storage medium having computer-readable instructions stored thereon, the computer-readable instructions being executable by a computerized device comprising processing hardware to execute the first method as described in conjunction with FIG. 2 and FIG. 3. The computer-readable instructions are optionally downloadable from a software application store, for example, from an "App store" to the computerized device.

Figure 4:
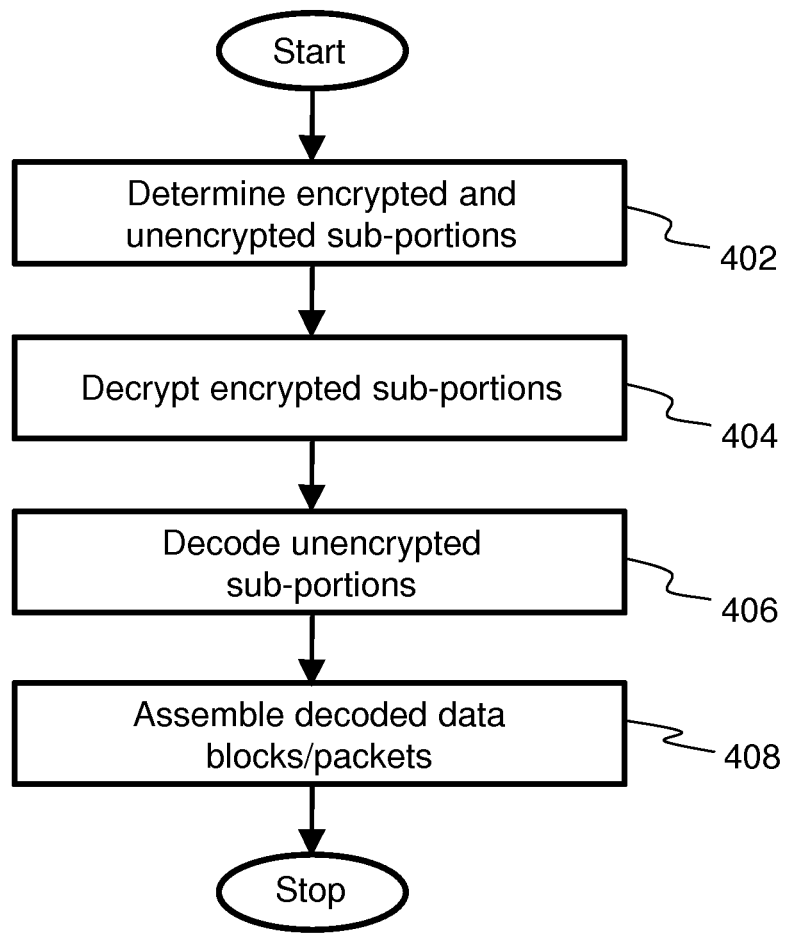
FIG. 4 is a schematic illustration of a flow chart depicting steps of a second method of decrypting and decoding encoded and encrypted data (E2) to generate corresponding decrypted and decoded data (D3), in accordance with an embodiment of the present disclosure.

FIG. 4 is a schematic illustration of a flow chart depicting steps of a second method of decrypting and decoding encoded and encrypted data (E2) to generate corresponding decrypted and decoded data (D3), in accordance with an embodiment of the present disclosure. The method is depicted as a collection of steps in a logical flow diagram, which represents a sequence of steps that can be implemented in hardware, software, or a combination thereof.

For illustration purposes only, the second method will next be illustrated with reference to the decoder 120 depicted in FIG. 1.

At a step 402, the data processing arrangement of the decoder 120 processes the encoded and encrypted data (E2) to determine one or more encrypted sub-portions and one or more unencrypted sub-portions thereof. The one or more unencrypted sub-portions of the encoded and encrypted data (E2) include non-critical data streams, namely encoded information of a plurality of data blocks and/or data packets.

At a step 404, the data processing arrangement of the decoder 120 decrypts the one or more encrypted sub-portions of the encoded and encrypted data (E2) to determine sizes, relative positions and/or one or more encoding methods that are associated with the plurality of data blocks and/or data packets. Optionally, at the step 404, the data processing arrangement of the decoder 120 also determines one or more entropy-encoding methods that are associated with the plurality of data blocks and/or data packets.

Optionally, at the step 404, the data processing arrangement of the decoder 120 decrypts the one or more encrypted sub-portions using at least one initialization vector ("Init Vector", IV) in combination with at least one key.

Optionally, the at least one key and/or the at least one initialization vector are supplied in operation to the decoder 120.

Figure 5:
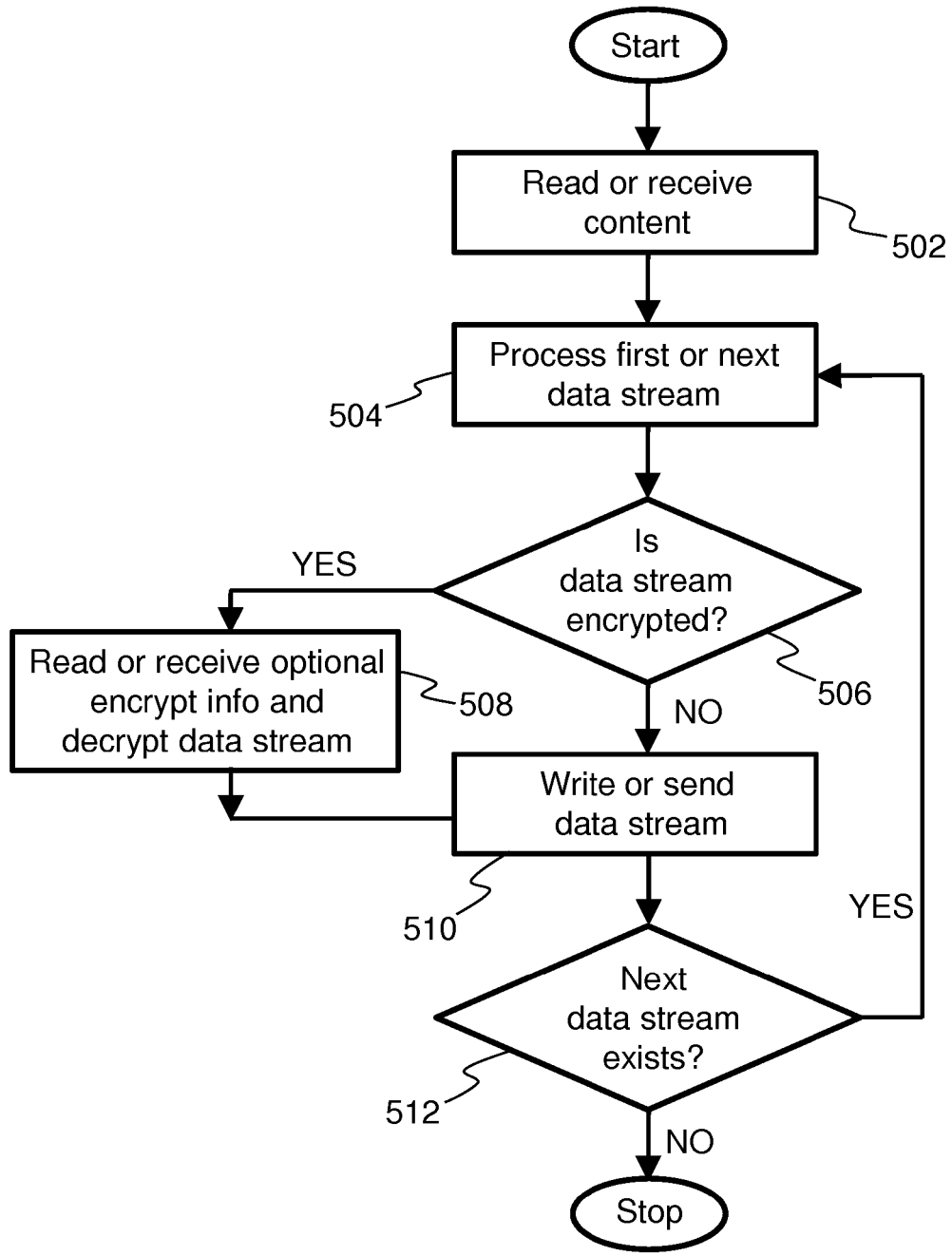
FIG. 5 is a schematic illustration of steps of a decrypting process, in accordance with an embodiment of the present disclosure.

A decrypting process of the step 404 has been described in conjunction with FIG. 5.

Next, at a step 406, the data processing arrangement of the decoder 120 applies an inverse of the one or more encoding methods determined at the step 404 to the encoded information of the plurality of data blocks and/or data packets, to decode the encoded information of the plurality of data blocks and/or data packets to generate a plurality of decoded data blocks and/or data packets. Optionally, at the step 406, the data processing arrangement of the decoder 120 also extracts information of entropy-encoding methods applied as well as the length information regarding the entropy-coded data blocks and/or packets and applies an inverse of the one or more entropy-encoding methods to a plurality of entropy-encoded data blocks and/or data packets included in the one or more unencrypted sub-portions of the encoded and encrypted data (E2), prior to applying the inverse of the one or more encoding methods. In case the intermediate encoded data streams were further compressed prior encryption being employed, the decoder 120 applies one or more corresponding inverse data de-compression methods.

Subsequently, at a step 408, the data processing arrangement of the decoder 120 assembles the plurality of decoded data blocks and/or data packets based on the sizes and/or relative positions determined at the step 404, to generate the decrypted and decoded data (D3).

The steps 402 to 408 are only illustrative and other alternatives can also be provided where one or more steps are added, one or more steps are removed, or one or more steps are provided in a different sequence without departing from the scope of the claims herein. For example, optionally, the method includes an additional step at which the data processing arrangement of the decoder 120 determines, from a first byte of at least one compressed data stream of the one or more encrypted sub-portions, an entropy encoding method that is associated with the at least one compressed data stream. Optionally, in the additional step, the data processing arrangement of the decoder 120 applies an inverse of the entropy encoding method to decompress the at least one compressed stream to determine the sizes, the relative positions and the one or more encoding methods that are associated with the plurality of data blocks and/or data packets.

Moreover, the step 404 is optionally performed using the CBC mode of the symmetric AES encryption algorithm. The step 404 is optionally performed using a randomly-generated IV, which is merged with the at least one key. It will be appreciated that the step 404 can be performed using other decryption algorithms, irrespective of whether or not IV is used for decrypting the one or more encrypted sub-portions, and irrespective of whether or not the CBC mode is used.

FIG. 5 is a schematic illustration of steps of the decrypting process, in accordance with an embodiment of the present disclosure.

At a step 502, the data processing arrangement of the decoder 120 reads or receives content of the encoded and encrypted data (E2).

At a step 504, the data processing arrangement of the decoder 120 processes a first or a next data stream included within the encoded and encrypted data (E2).

At a step 506, the data processing arrangement of the decoder 120 determines whether or not the first or the next data stream is encrypted. Optionally, at the step 506, the determination is made based on at least one of: the aforementioned first byte, the aforementioned most significant bit (MSB) in an entropy encoding method byte and/or word, the order of unencrypted and encrypted data streams, and/or the aforementioned flag bits.

If, at the step 506, it is determined that the first or the next data stream is encrypted, a step 508 is performed. Otherwise, if it is determined that the first or the next data stream is unencrypted, a step 510 is performed.

At the step 508, the data processing arrangement of the decoder 120 decrypts the first or the next data stream. In accordance with the step 508, the data processing arrangement of the decoder 120 optionally reads or receives encryption information, namely information indicative of one or more encryption algorithms associated with the first or the next data stream.

Thereafter, at the step 510, the data processing arrangement of the decoder 120 writes or sends the decrypted data stream.

When the first or the next data stream is unencrypted, the data processing arrangement of the decoder 120 writes or sends the first or the next data stream as it is, at the step 510.

Next, at a step 512, the data processing arrangement of the decoder 120 determines whether or not a next data stream exists in the encoded and encrypted data (E2). If it is determined that a next data stream exists, the decrypting process restarts at the step 502. Otherwise, if it is determined that no next data stream exists in the encoded and encrypted data (E2), the decrypting process stops.

The steps 502 to 512 are only illustrative and other alternatives can also be provided where one or more steps are added, one or more steps are removed, or one or more steps are provided in a different sequence without departing from the scope of the claims herein.

Embodiments of the present disclosure provide a computer program product comprising a non-transitory (namely non-transient) computer-readable storage medium having computer-readable instructions stored thereon, the computer-readable instructions being executable by a computerized device comprising processing hardware to execute the second method as described in conjunction with FIG. 4 and FIG. 5. The computer-readable instructions are optionally downloadable from a software application store, for example, from an "App store" to the computerized device.

The aforementioned encryption method and the encrypting process are suitable for implementation into an encoder or another, corresponding pre-processor. Similarly, the aforementioned decryption method and the decrypting process are suitable for implementation into a decoder or another, corresponding pre-processor. The aforementioned methods can be implemented in software and/or via use of a hardwired logic, for example ASIC's. It is well known that many systems have a dedicated microchip for encryption, for example contemporary AES, that implements the encryption efficiently, while using less power than a pure software approach. The aforementioned methods make it possible to achieve considerable power and energy savings, when compared to prior art approaches of using encryption with a corresponding strength against third-party attacks, for example against surveillance organizations.

In a case that the encryption method pursuant to embodiments of the present disclosure is executed as a software implementation, then it is beneficial to execute that software process either entirely or partially in protected memory space. Such a precaution assists to try to prevent possible malware from reading the information to be encrypted, or the encryption key used in the encryption process. Correspondingly, in such a case, the decryption is advantageously then also be executed in protected memory space. Even if many current devices include a dedicated microchip for encryption, or there is a separate instruction set available for encryption, as in the aforementioned AES, it is still beneficial for an encryption solution pursuant to the present disclosure to ensure that plain text data which is encrypted is processed entirely in protected memory space, or in partially protected memory space; in the latter case, the plain text data to be encrypted can be processed outside protected memory space, if for example the encryption keys being used are processed in protected memory space. Most beneficially, the plain-text information always exists in its unencrypted form only in protected memory. If this is however not possible, it is advantageous to ensure that it will not end up as such to an unprotected memory after the encryption. That part of the data that is encrypted, for example pursuant to the embodiments of the present disclosure, are advantageously always stored only in protected memory. Memory protection is such protection that can be implemented in most operating systems, for example contemporary types of operating system, but the techniques and accessing mechanisms may potentially vary.

The methods pursuant to embodiments of the present disclosure can be implemented with any suitable encoding solution, irrespective of which encryption algorithm is used. In doing so, the aforementioned methods do not alter a behavior of an encryption algorithm, which means that the protection provided by the encryption algorithm is not compromised.

The aforementioned methods make it possible to use a very fast, yet efficient encryption algorithm. In this regard, the aforementioned methods use an encryption algorithm efficiently, without interfering with an inner operation of the encryption algorithm itself. Examples of encryption algorithms that are suitable for implementation with the aforementioned methods include, but are not limited to, AES, RSA, Twofish, Blowfish, Data Encryption Standard (DES), Triple DES (3-DES), Serpent, International Data Encryption Algorithm (IDEA), MARS, Rivest Cipher 6 (RC6), Camellia, CAST-128, Skipjack, eXtended Tiny Encryption Algorithm (XTEA), and so forth; these example names include registered trademarks.

The aforementioned methods pursuant to embodiments of the present disclosure provide a very fast and a considerably efficient way of protecting data, when compared with known prior art methods. Notably, only one or more essential and critical parts of encoded data are encrypted. For example, when images or video are coded with the progressive GMVC® coding solution, typically only from a $1/100^{th}$ to a $1/1000^{th}$ part of the entire encoded data is protected with encryption, as elucidated earlier. Therefore, it can be concluded that using encryption in such a manner does not have any significant effect in a transfer rate of real-time videos, nor does it increase a consumption of computing resources in any significant manner.

Moreover, an additional advantage of the encryption process is that the encoded and encrypted data (E2) is not required to be transferred over networks with a protected, secure network connection, for example employing Virtual Private Network (VPN) tunneling, Secure Shell (SSH), or SSL/TLS protocols. Therefore, the aforementioned methods offer an advantageous model for transmitting text, binary, audio, image, video and other types of data, for example, in public Internet networks or in web services and cloud services.

Embodiments of the present disclosure are susceptible to being employed in a wide range of systems and devices, for example, such as smart telephones, Personal Computers (PC's), audio-visual apparatus, cameras, communication networks, data storage devices, surveillance systems, video conferencing systems, medical apparatus, seismic apparatus, surveying apparatus, "black box" flight recorders, digital musical instruments using sampling techniques, but not limited thereto.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

We claim:

1. An apparatus (110) for encoding and encrypting an input data (D1) to generate a corresponding encoded and encrypted data (E2), wherein the apparatus (110) comprises a hardware processor configured to execute non-transitory machine readable program instructions, and wherein the hardware processor is configured to:

(a) divide and/or combine the input data (D1) into a plurality of data blocks and/or data packets, and encode the input data (D1) using a plurality of encoding methods to generate a plurality of intermediate encoded data streams, wherein the plurality of intermediate encoded data streams comprises at least two encoded critical data streams and one or more remaining encoded data streams, wherein at least one of the at least two encoded critical data streams comprise information indicating a plurality of encoding methods used to encode at least a portion of the input data (D1) to the plurality of intermediate encoded data streams, and wherein the at least two encoded critical data streams represent only a part of the plurality of intermediate encoded data streams, and wherein the at least two encoded critical data streams are required to decode the one or more remaining encoded data streams, and wherein the at least two encoded critical data streams comprise information indicative of at least one of: a plurality of split and/or combine operations that are employed to divide and/or combine the input data (D1) into the plurality of data blocks and/or data packets, one or more encoding methods that are employed for encoding information of the plurality of data blocks and/or data packets, one or more entropy-encoding methods that are employed for entropy-encoding the plurality of data blocks and/or data packets into a plurality of entropy-encoded data bocks and/or data packets and/or a length of the plurality of entropy-encoded data blocks and/or data packets in the entropy-encoded data streams, and/or a length of one or more of the data blocks and/or data packets in the plurality of data blocks and/or data packets prior to encoding being applied;

(b) encrypt the at least two encoded critical data streams using one or more encryption methods to generate at least two intermediate encrypted data streams; and (c) merge unencrypted portions of the plurality of intermediate encoded data streams together with the at least two intermediate encrypted data streams to generate the encoded and encrypted data (E2).

2. An apparatus (110) as claimed in claim 1, wherein the input data (D1) is divided into a plurality of data blocks and/or data packets, and wherein the hardware processor is configured to perform a statistical analysis and/or an iterative analysis of the plurality of data blocks and/or data packets to determine a plurality of parameters that are indicative of statistical variation within their respective data blocks and/or data packets, and wherein the data processing arrangement is operable to employ the plurality of parameters to select the one or more encoding methods to be used to encode the information of the plurality of data blocks and/or data packets to generate the plurality of intermediate encoded data streams.

3. An apparatus (110) as claimed in claim 1, wherein the input data (D1) is at least one of: one-dimensional data, multi-dimensional data, text data, binary data, sensor data, audio data, image data, video data, encoded data.

4. An apparatus (110) as claimed in claim 1, wherein the hardware processor is configured to compress at least one of the at least two encoded critical data streams into at least one compressed critical data stream prior to encrypting the at least one of the at least two encoded critical data streams.

5. An apparatus (110) as claimed in claim 4, wherein the hardware processor is configured to compute a first byte of the at least one compressed data stream, wherein the first byte describes an entropy encoding method that is employed for compressing the at least one compressed data stream.

6. An apparatus (110) as claimed in claim 1, wherein the hardware processor is configured to define encryption by using at least one of: a new byte that is written at a beginning of an encrypted data stream, a most significant bit in an entropy encoding method byte and/or word, an order in which unencrypted and encrypted data streams are included in the encoded and encrypted data (E2), a flag bit.

7. A method of encoding and encrypting an input data (D1) to generate corresponding encoded and encrypted data (E2), the method comprising:
(a) encoding the input data (D1) using a plurality of coding methods to generate a plurality of intermediate encoded data streams, wherein the plurality of intermediate encoded data streams comprises at least two encoded critical data streams and one or more remaining encoded data streams, and wherein at least one of the at least two encoded critical data streams comprise information indicating a plurality of encoding methods used to encode at least a portion of the input data (D1) to the plurality of the intermediate encoded data streams, and wherein the at least two encoded critical data streams represent only a part of the plurality of intermediate encoded data streams, and wherein the at least two encoded critical data streams are required to decode the one or more remaining encoded data streams, and wherein the at least two encoded critical data streams comprise information indicative of at least one of: a plurality of split and/or combine operations that are employed to divide and/or combine the input data (D1) into the plurality of data blocks and/or data packets, one or more encoding methods that are employed for encoding information of the plurality of data blocks and/or data packets, one or more entropy-encoding methods that are employed for entropy-encoding the plurality of data blocks and/or data packets into a plurality of entropy-encoded data bocks and/or data packets and/or a length of the plurality of entropy-encoded data blocks and/or data packets in the entropy-encoded data streams, and/or a length of one or more of the data blocks and/or data packets in the plurality of data blocks and/or data packets prior to encoding being applied;
(b) encrypting the at least two encoded critical data streams using one or more encryption algorithms to generate at least two intermediate encrypted data streams; and
(c) merging unencrypted portions of the plurality of intermediate encoded data streams together with the at least two intermediate encrypted data streams to generate the encoded and encrypted data (E2).

8. A method as claimed in claim 7, wherein the input data (D1) is divided into a plurality of data blocks and/or data packets, and wherein the method comprises:
(d) performing a statistical analysis and/or an iterative analysis of the plurality of data blocks and/or data packets to determine a plurality of parameters that are indicative of statistical variation within their respective data blocks and/or data packets; and
(e) employing the plurality of parameters to select the one or more encoding methods to be used to encode the information of the plurality of data blocks and/or data packets to generate the plurality of intermediate encoded data streams.

9. A method as claimed in claim 7, wherein the input data (D1) is at least one of: one-dimensional data, multi-dimensional data, text data, binary data, sensor data, audio data, image data, video data, encoded data.

10. A method as claimed in claim 7, wherein the method comprises compressing the at least one of the at least two encoded critical data streams into at least one compressed data stream prior to encrypting the at least one of the at least two encoded critical data streams.

11. An apparatus (120) for decrypting and decoding encoded and encrypted data (E2) to generate corresponding decrypted and decoded data (D3), wherein the apparatus (120) comprises a hardware processor configured to execute non-transitory program instructions, and wherein the hardware processor is configured to:
(i) process the encoded and encrypted data (E2) to determine one or more encrypted portions and one or more unencrypted portions thereof, wherein the one or more unencrypted portions of the encoded and encrypted data (E2) comprise encoded information of a plurality of data blocks and/or data packets, and wherein the one or more encrypted portions comprise at least two encoded critical data streams, wherein the at least two encoded critical data streams are required to decode the one or more remaining encoded data streams; and wherein the at least two encoded critical data streams comprise information indicative of at least one of: a plurality of split and/or combine operations that are employed to divide and/or combine the input data (D1) into the plurality of data blocks and/or data packets, one or more encoding methods that are employed for encoding information of the plurality of data blocks and/or data packets, one or more entropy-encoding methods that are employed for entropy-encoding the plurality of data blocks and/or data packets into a plurality of entropy-encoded data bocks and/or data packets and/or a length of the plurality of entropy-encoded data blocks and/or data packets in the entropy-encoded data streams, and/or a length of one or more of the data blocks and/or data packets in the plurality of data blocks and/or data packets prior to encoding being applied;

(ii) decrypt the one or more encrypted portions to determine sizes and/or relative positions and/or the plurality of encoding methods that are associated with the plurality of data blocks and/or data packets;

(iii) apply an inverse of the plurality of encoding methods to the encoded information of the plurality of data blocks and/or data packets to decode the encoded information of the plurality of data blocks and/or data packets to generate a plurality of decoded data blocks and/or data packets; and (iv) assemble the plurality of decoded data blocks and/or data packets based on the sizes and/or relative positions associated with the plurality of data blocks and/or data packets to generate the decrypted and decoded data (D3).

12. An apparatus (120) as claimed in claim 11, wherein the one or more encrypted portions are provided in a form of at least one compressed data stream, and the data processing arrangement is configured to determine, from a first byte of the at least one compressed data stream, an entropy encoding method that is associated with the at least one compressed data stream.

13. An apparatus (120) as claimed in claim 11, wherein the hardware processor is configured to determine the one or more encrypted portions and the one or more unencrypted portions using at least one of: a new byte that is written at a beginning of an encrypted data stream, a most significant bit in an entropy encoding method byte and/or word, a knowledge of an order in which unencrypted and encrypted data streams are included in the encoded and encrypted data (E2), a flag bit.

14. An apparatus (120) as claimed in claim 11, wherein the hardware processor is configured to decrypt and decode the encoded and encrypted data (E2) provided in a form of at least one of: encoded and encrypted one-dimensional data, encoded and encrypted multi-dimensional data, encoded and encrypted text data, encoded and encrypted binary data, encoded and encrypted sensor data, encoded and encrypted audio data, encoded and encrypted image data, encoded and encrypted video data.

15. A method of decrypting and decoding encoded and encrypted data (E2) to generate corresponding decrypted and decoded data (D3), the method comprising:

(i) processing the encoded and encrypted data (E2) to determine one or more encrypted portions and one or more unencrypted portions thereof, wherein the one or more unencrypted portions of the encoded and encrypted data (E2) comprise encoded information of a plurality of data blocks and/or data packets, and wherein the one or more encrypted portions comprise at least two encoded critical data streams, wherein the at least two encoded critical data streams are required to decode the one or more remaining encoded data streams, and wherein the at least two encoded critical data streams comprise information indicative of at least one of: a plurality of split and/or combine operations that are employed to divide and/or combine the input data (D1) into the plurality of data blocks and/or data packets, one or more encoding methods that are employed for encoding information of the plurality of data blocks and/or data packets, one or more entropy-encoding methods that are employed for entropy-encoding the plurality of data blocks and/or data packets into a plurality of entropy-encoded data bocks and/or data packets and/or a length of the plurality of entropy-encoded data blocks and/or data packets in the entropy-encoded data streams, and/or a length of one or more of the data blocks and/or data packets in the plurality of data blocks and/or data packets prior to encoding being applied;

(ii) decrypting the one or more encrypted portions to determine sizes and/or relative positions and/or the plurality of encoding methods that are associated with the plurality of data blocks and/or data packets;

(iii) applying an inverse of the plurality of encoding methods to the encoded information of the plurality of data blocks and/or data packets to decode the encoded information of the plurality of data blocks and/or data packets to generate a plurality of decoded data blocks and/or data packets; and (iv) assembling the plurality of decoded data blocks and/or data packets based on the sizes and/or relative positions associated with the plurality of data blocks and/or data packets to generate the decrypted and decoded data (D3).

16. A method as claimed in claim 15, wherein the one or more encrypted portions are provided in a form of at least one compressed data stream, and the method comprises operating the data processing arrangement to determine, from a first byte of the at least one compressed data stream, an entropy encoding method that is associated with the at least one compressed data stream.

17. A method as claimed in claim 15, wherein the method comprises operating the data processing arrangement to determine the one or more encrypted portions and the one or more unencrypted sub-portions using at least one of: a new byte that is written at a beginning of an encrypted data stream, a most significant bit in an entropy encoding method byte and/or word, a knowledge of an order in which unencrypted and encrypted data streams are included in the encoded and encrypted data (E2), a flag bit.

18. A method as claimed in claim 15, wherein the method comprises operating the data processing arrangement to decrypt and decode the encoded and encrypted data (E2) provided in a form of at least one of: encoded and encrypted one-dimensional data, encoded and encrypted multi-dimensional data, encoded and encrypted text data, encoded and encrypted binary data, encoded and encrypted sensor data, encoded and encrypted audio data, encoded and encrypted image data, encoded and encrypted video data.

\* \* \* \* \*